US010625532B2

(12) United States Patent
Kaule et al.

(10) Patent No.: US 10,625,532 B2
(45) Date of Patent: Apr. 21, 2020

(54) SECURITY ELEMENT

(71) Applicant: GIESECKE+DEVRIENT CURRENCY TECHNOLOGY GMBH, Munich (DE)

(72) Inventors: Wittich Kaule, Emmering (DE); Michael Rahm, Hemau (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 757 days.

(21) Appl. No.: 14/102,223

(22) Filed: Dec. 10, 2013

(65) Prior Publication Data

US 2014/0175785 A1 Jun. 26, 2014

Related U.S. Application Data

(63) Continuation of application No. 12/665,072, filed as application No. PCT/EP2008/005173 on Jun. 25, 2008, now Pat. No. 8,632,100.

(30) Foreign Application Priority Data

Jun. 25, 2007 (DE) .................. 10 2007 029 203

(51) Int. Cl.
*B42D 25/00* (2014.01)
*B42D 25/324* (2014.01)
(Continued)

(52) U.S. Cl.
CPC ........... *B42D 25/342* (2014.10); *B42D 25/00* (2014.10); *B42D 25/21* (2014.10); *B42D 25/29* (2014.10);
(Continued)

(58) Field of Classification Search
CPC ..................... B42D 25/00; G02B 27/2214
(Continued)

(56) References Cited

U.S. PATENT DOCUMENTS 1,475,430 A 11/1923 Curwen
5,712,731 A * 1/1998 Drinkwater .......... G02B 5/1885
359/619
(Continued)

FOREIGN PATENT DOCUMENTS

DE 3602563 C1 4/1987
DE 19949542 A1 4/2001
(Continued)

OTHER PUBLICATIONS

U.S. Appl. No. 11/568,302, filed Oct. 25, 2006, Hoffmuller, 2007-0216518, WO 2005/105474.
(Continued)

*Primary Examiner* — Kyle R Grabowski
(74) *Attorney, Agent, or Firm* — Lathrop GPM LLP

(57) ABSTRACT

The present invention relates to a security element (16) for security papers, value documents and the like, having a microoptical moiré-type magnification arrangement for depicting a moiré image (84) having one or more moiré image elements (86), having
a motif image that includes a periodic or at least locally periodic arrangement of a plurality of lattice cells (24) having micromotif image portions (28, 28', 28"),
for the moiré-magnified viewing of the motif image, a focusing element grid (22) that is arranged spaced apart from the motif image and that includes a periodic or at least locally periodic arrangement of a plurality of lattice cells having one microfocusing element (22) each,
wherein, taken together, the micromotif image portions (28, 28', 28") of multiple spaced-apart lattice cells (24) of the
(Continued)

Figure 1:
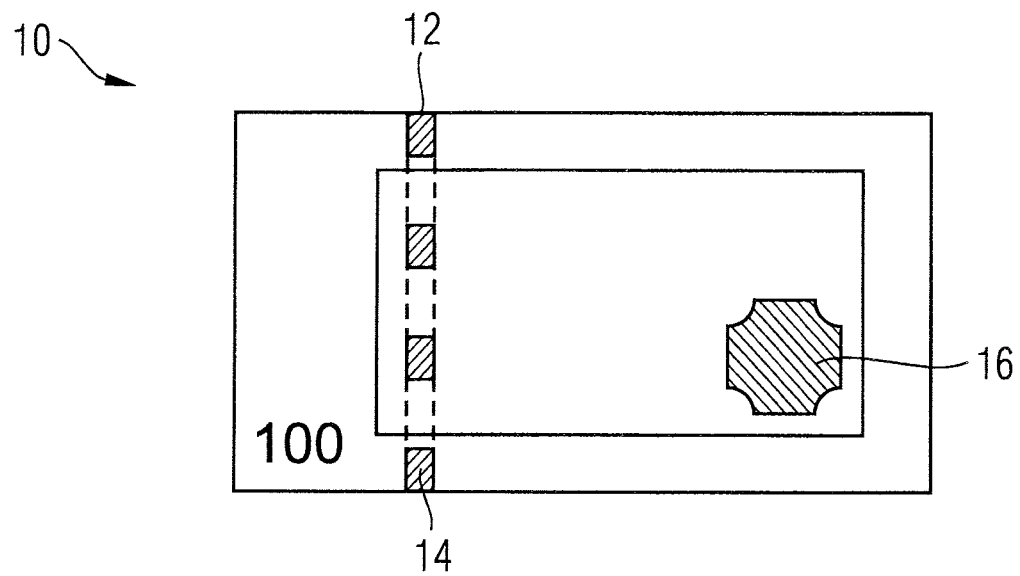

motif image each form one micromotif element (50) that corresponds to one of the moiré image elements (86) of the magnified moiré image (84) and whose dimension is larger than one lattice cell (24) of the motif image.

11 Claims, 15 Drawing Sheets

(51) Int. Cl.
*B42D 25/342* (2014.01)
*B42D 25/21* (2014.01)
*G02B 27/60* (2006.01)
*B42D 25/29* (2014.01)

(52) U.S. Cl.
CPC ............ *G02B 27/60* (2013.01); *B42D 25/324* (2014.10); *Y10T 29/49* (2015.01); *Y10T 29/49826* (2015.01)

(58) Field of Classification Search
USPC .................................... 359/619–620; 380/54
See application file for complete search history.

(56) References Cited

U.S. PATENT DOCUMENTS

| | | | |
|---|---|---|---|
| 5,723,200 A | 3/1998 | Oshima et al. | |
| 5,772,250 A | 6/1998 | Gasper | |
| 6,288,842 B1 | 9/2001 | Florczak et al. | |
| 6,329,040 B1 | 12/2001 | Oshima et al. | |
| 6,831,787 B1 | 12/2004 | Scarbrough et al. | |
| 7,194,105 B2 * | 3/2007 | Hersch ................ | B42D 25/342 382/100 |
| 7,667,894 B2 | 2/2010 | Hoffmuller | |
| 7,728,931 B2 | 6/2010 | Hoffmuller | |
| 7,751,608 B2 * | 7/2010 | Hersch ................ | B42D 25/342 283/94 |
| 7,808,605 B2 | 10/2010 | Hoffmuller | |
| 7,986,459 B2 | 7/2011 | Kaule | |
| 8,083,894 B2 | 12/2011 | Gruszczynski | |
| 8,149,511 B2 | 4/2012 | Kaule | |
| 8,632,100 B2 | 1/2014 | Kaule et al. | |
| 2006/0003295 A1 | 1/2006 | Hersch et al. | |
| 2007/0177131 A1 | 8/2007 | Hansen | |
| 2007/0211238 A1 | 9/2007 | Hoffmuller | |
| 2007/0229263 A1 | 10/2007 | Staub et al. | |
| 2007/0241553 A1 | 10/2007 | Heim | |
| 2007/0246933 A1 | 10/2007 | Heim | |
| 2007/0274559 A1 | 11/2007 | Depta | |
| 2008/0014378 A1 | 1/2008 | Hoffmuller | |
| 2008/0037131 A1 | 2/2008 | Steenblik et al. | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 * | 7/2008 | Kaule ................. | B42D 25/355 428/29 |
| 2008/0163994 A1 | 7/2008 | Hoppe | |
| 2008/0182084 A1 | 7/2008 | Tompkin et al. | |
| 2008/0216976 A1 | 9/2008 | Ruck | |
| 2008/0250954 A1 | 10/2008 | Depta | |
| 2008/0258456 A1 | 10/2008 | Rahm | |
| 2008/0259416 A1 | 10/2008 | Peters et al. | |
| 2009/0001709 A1 | 1/2009 | Kretschmar | |
| 2009/0008923 A1 | 1/2009 | Kaule et al. | |
| 2009/0008926 A1 | 1/2009 | Depta | |
| 2009/0034082 A1 | 2/2009 | Commander et al. | |
| 2009/0102605 A1 | 4/2009 | Kaule | |
| 2009/0115185 A1 | 5/2009 | Hoffmuller | |
| 2009/0218397 A1 | 9/2009 | Wild et al. | |
| 2009/0290221 A1 | 11/2009 | Hansen et al. | |
| 2009/0297805 A1 | 12/2009 | Dichtl | |
| 2009/0322071 A1 | 12/2009 | Dichtl | |
| 2010/0175843 A1 | 6/2010 | Gregarek | |
| 2010/0177094 A1 | 7/2010 | Kaule | |
| 2010/0182221 A1 | 7/2010 | Kaule | |
| 2010/0194091 A1 | 8/2010 | Heim | |
| 2010/0194532 A1 | 8/2010 | Kaule | |
| 2010/0196587 A1 | 8/2010 | Keller | |
| 2010/0207376 A1 | 8/2010 | Heim | |
| 2010/0208036 A1 | 8/2010 | Kaule | |
| 2010/0277805 A1 * | 11/2010 | Schilling ................ | B42D 25/00 359/619 |
| 2010/0307705 A1 | 12/2010 | Rahm | |
| 2010/0308570 A1 | 12/2010 | Heim | |
| 2010/0320742 A1 | 12/2010 | Hoffmuller | |
| 2011/0000737 A1 | 1/2011 | Heim | |
| 2011/0012337 A1 | 1/2011 | Heim | |
| 2011/0027538 A1 | 2/2011 | Hoffmann | |
| 2011/0045248 A1 | 2/2011 | Hoffmuller | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | | |
|---|---|---|---|
| DE | 102004007379 B3 | 9/2005 | |
| DE | 102004031879 A1 | 1/2006 | |
| DE | 102004059798 A1 | 6/2006 | |
| DE | 102005028162 A1 | 12/2006 | |
| DE | 102005052562 A1 | 5/2007 | |
| DE | 102005062132 A1 | 7/2007 | |
| DE | 102006006501 A1 | 8/2007 | |
| DE | 102006029536 A1 | 12/2007 | |
| DE | 102006029850 A1 | 1/2008 | |
| DE | 102007029203 A1 | 1/2009 | |
| DE | 102007062089 A1 | 7/2009 | |
| EP | 0064067 A1 | 11/1982 | |
| EP | 0238043 A2 | 9/1987 | |
| EP | 0330733 A1 | 9/1989 | |
| EP | 1554700 B1 | 1/2007 | |
| EP | 1953002 A2 | 1/2008 | |
| GB | 2362493 A * | 11/2001 | ............ G09F 19/12 |
| JP | 10035083 A | 2/1998 | |
| JP | 2001 055000 A | 2/2001 | |
| JP | 2003 039583 A | 3/2003 | |
| JP | 2003 120500 A | 4/2003 | |
| WO | WO 1994/027254 A1 | 11/1994 | |
| WO | WO 1999/013157 A1 | 3/1999 | |
| WO | WO 2003/005075 A1 | 1/2003 | |
| WO | WO 2005/052650 A2 | 6/2005 | |
| WO | WO 2005/106601 A2 | 11/2005 | |
| WO | WO 05105473 | 11/2005 | |
| WO | WO 05105474 | 11/2005 | |
| WO | WO 05105475 | 11/2005 | |
| WO | WO 05108106 | 11/2005 | |
| WO | WO 05108108 | 11/2005 | |
| WO | WO 05108110 | 11/2005 | |
| WO | WO 2005106601 A2 * | 11/2005 | ............ B42D 25/00 |
| WO | WO 06005434 | 1/2006 | |
| WO | WO 06015733 | 2/2006 | |
| WO | WO 06018171 | 2/2006 | |
| WO | WO 06018172 | 2/2006 | |
| WO | WO 2006/029745 A1 | 3/2006 | |
| WO | WO 06040069 | 4/2006 | |
| WO | WO 06056342 | 6/2006 | |
| WO | WO 06072380 | 7/2006 | |
| WO | WO 2006/087138 A1 | 8/2006 | |
| WO | WO 06087138 | 8/2006 | |
| WO | WO 06099971 | 9/2006 | |
| WO | WO 06119896 | 11/2006 | |
| WO | WO 06128607 | 12/2006 | |
| WO | WO 2007/007793 A1 | 1/2007 | |
| WO | WO 07006445 | 1/2007 | |
| WO | WO 07006455 | 1/2007 | |
| WO | WO 2007/030530 A2 | 3/2007 | |

(56) References Cited

FOREIGN PATENT DOCUMENTS

| WO | WO 2007/076952 A2 | 7/2007 |
|---|---|---|
| WO | WO 07076952 | 7/2007 |
| WO | WO 07079851 | 7/2007 |
| WO | WO 2007/087984 A1 | 8/2007 |
| WO | WO 07115648 | 10/2007 |
| WO | WO 2007/131765 A2 | 11/2007 |
| WO | WO 08/000350 | 1/2008 |
| WO | WO 08/000351 | 1/2008 |
| WO | WO 2008/000350 A1 | 1/2008 |
| WO | WO 2008/000351 A2 | 1/2008 |
| WO | WO 08/049533 | 5/2008 |
| WO | WO 08/061636 | 5/2008 |
| WO | WO 08/071325 | 6/2008 |
| WO | WO 09/000527 | 12/2008 |
| WO | WO 09/000528 | 12/2008 |
| WO | WO 09/000529 | 12/2008 |
| WO | WO 09/000530 | 12/2008 |
| WO | WO 2009/000528 A1 | 12/2008 |
| WO | WO 2009/000529 A2 | 12/2008 |
| WO | WO 09/012893 | 1/2009 |
| WO | WO 09/024265 | 2/2009 |
| WO | WO 09/080262 | 7/2009 |
| WO | WO 09/080263 | 7/2009 |
| WO | WO 09/083146 | 7/2009 |
| WO | WO 09/083151 | 7/2009 |
| WO | WO 09/100831 | 8/2009 |
| WO | WO 09/100869 | 8/2009 |
| WO | WO 09/109291 | 9/2009 |
| WO | WO 09/121578 | 10/2009 |
| WO | WO 09/149831 | 12/2009 |
| WO | WO 09/149833 | 12/2009 |
| WO | WO 09/156079 | 12/2009 |
| WO | WO 10/000470 | 1/2010 |
| WO | WO 10/003646 | 1/2010 |
| WO | WO 10/028739 | 3/2010 |
| WO | WO 11/012281 | 2/2011 |
| WO | WO 11/032665 | 3/2011 |
| WO | WO 11/032671 | 3/2011 |

OTHER PUBLICATIONS

U.S. Appl. No. 11/568,386, filed Oct. 26, 2006, Hoffmuller, 2007-0229928, WO 2005/105473.
U.S. Appl. No. 11/568,388, filed Oct. 26, 2006, Hoffmuller, 2007-0211238, WO 2005/108108.
U.S. Appl. No. 11/568,390, filed Oct. 26, 2006, Hoffmuller, 2007-0165182, WO 2005/105475.
U.S. Appl. No. 11/568,535, filed Nov. 12, 2007, Depta, 2008-0088859, WO 2005108106.
U.S. Appl. No. 11/568,538, filed Sep. 23, 2008, Depta, 2009-0008926, WO 2005/108110.
U.S. Appl. No. 11/571,923, filed Jan. 10, 2007, Hoffmuller, 2008-0014378, WO 2006/005434.
U.S. Appl. No. 11/573,060, filed Feb. 1, 2007, Depta, 2007-0274559, WO 2006/015733.
U.S. Appl. No. 11/573,484, filed Feb. 9, 2007, Heim, 2007-0246933, WO 2006/018171.
U.S. Appl. No. 11/573,506, filed Feb. 9, 2007, Burchard, 2008-0054621, WO 2006/018172.
U.S. Appl. No. 11/576,583, filed Apr. 3, 2007, Heim, 2007-0241553, WO 2006040069.
U.S. Appl. No. 11/719,843, filed Apr. 3, 2008, Kaule, 2009-0102605, WO 2006/056342.
U.S. Appl. No. 11/813,077, filed Jun. 28, 2007, Hoppe, 2008-0163994, WO 2006/072380.
U.S. Appl. No. 11/779,707, filed Jul. 18, 2007, Fessl, 2008-0079257, n/a.
U.S. Appl. No. 11/816,514, filed Aug. 16, 2007, Kaule, 2008-0160226, WO 2006/087138.
U.S. Appl. No. 11/909,115, filed Sep. 19, 2007, Kretschmar, 2009-0001709, WO 2006/099971.
U.S. Appl. No. 11/913,658, filed May 14, 2008, Ruck, 2008-0216976, WO 2006/119896.
U.S. Appl. No. 11/915,965, filed Nov. 29, 2007, Depta, 2008-0250954, WO 2006/128607.
U.S. Appl. No. 11/995,227, filed Jan. 10, 2008, Gruszczynski, 2009-0236061, WO 2007/006445.
U.S. Appl. No. 11/995,228, filed Jan. 10, 2008, Kaule, 2008-0198468, WO 2007/006455.
U.S. Appl. No. 12/097,668, filed Jun. 16, 2008, Rahm, 2008-0258456, WO 2007/079851.
U.S. Appl. No. 12/097,834, filed Jun. 17, 2008, Kaule, 2009-0008923, WO 2007/076952.
U.S. Appl. No. 12/294,222, filed Sep. 23, 2008, Hoffmuller, 2009-0115185, WO 2007/115648.
U.S. Appl. No. 12/304,498, filed Dec. 12, 2008, Dichtl, 2009-0297805, WO 2008/000350.
U.S. Appl. No. 12/304,522, filed Dec. 12, 2008, Dichtl, 2009-0322071, WO 2008/000351.
U.S. Appl. No. 12/446,494, filed Apr. 21, 2009, Heim, 2010-0194091, WO 2008/049533.
U.S. Appl. No. 12/515,923, filed May 21, 2009, Heim, 2010-0207376, WO 2008/061636.
U.S. Appl. No. 12/517,848, filed Jun. 8, 2010, Gregarek, 2010-0175843, WO 2008/071325.
U.S. Appl. No. 12/665,072, filed Dec. 17, 2009, Kaule, 2010-0194532, WO 2009/000529.
U.S. Appl. No. 12/665,078, filed Dec. 17, 2009, Kaule, 2010-0182221, WO 2009/000528.
U.S. Appl. No. 12/665,834, filed Dec. 21, 2009, Kaule, 2010 0208036, WO 2009/000530.
U.S. Appl. No. 12/665,843, filed Dec. 21, 2009 Kaule, 2010-0177094, WO 2009/000527.
U.S. Appl. No. 12/669,838, filed Jan. 20, 2010, Keller, 2010-0196587, WO 2009/012893.
U.S. Appl. No. 12/673,805, filed Feb. 17, 2010, Dichtl, 2011-0069360, WO 2009/024265.
U.S. Appl. No. 12/808,733, filed Jun. 17, 2010, Heim, 2010-0308570, WO 2009/080263.
U.S. Appl. No. 12/809,002, filed Jun. 17, 2010, Heim, 2011-0079997, WO 2009/080262.
U.S. Appl. No. 12/809,334, filed Jun. 18, 2010, Rahm, 2010-0307705, WO 2009/083151.
U.S. Appl. No. 12/809,909, filed Jun. 21, 2010, Hoffmuller, 2011-0045248, WO 2009/083146.
U.S. Appl. No. 12/865,461, filed Aug. 12, 2010, Hoffmulle, 2010-0320742, WO 2009/100869.
U.S. Appl. No. 12/865,474, filed Aug. 15, 2010, Heim, 2011-0000737, WO 2009/100831.
U.S. Appl. No. 12/920,764, filed Sep. 9, 2010, Heim, 2011-0012337, WO 2009/109291.
U.S. Appl. No. 12/935,320, filed Oct. 2, 2010, Hoffmann, 2011-0027538, WO 2009/121578.
U.S. Appl. No. 12/997,130, filed Dec. 9, 2010, Heim, 2011-0091665, WO 2009/149833.
U.S. Appl. No. 12/997, 323, filed Dec. 10, 2010, Heim, 2011-0101670, WO 2009/149831.
U.S. Appl. No. 12/999,685, filed Dec. 17, 2010, Hoffmuller, 2011-0109078, WO 2009/156079.
U.S. Appl. No. 13/002,117, filed Dec. 30, 2010, Hoffmuller, 2011-0095518, WO 2010/000470.
U.S. Appl. No. 13/002,861, filed Jan. 6, 2011, Heim, 2011-0114733, WO 2010/003646.
U.S. Appl. No. 13/062,991, filed Mar. 9, 2011, Kaule, 2011-0157183, WO 2010/028739.
U.S. Appl. No. 13/387,437, filed Jan. 27, 2012, Dorfler, 2012-0126525, WO 2011/012281.
U.S. Appl. No. 13/395,333, filed Mar. 9, 2012, Fuhse, 2012-0170124, WO 2011/032665.
U.S. Appl. No. 13/496,552, filed Mar. 16, 2012, Schutzmann, 2012-0168515, WO 2011/032671.

* cited by examiner

SECURITY ELEMENT

CROSS-REFERENCE TO RELATED APPLICATIONS

This application is a continuation of U.S. application Ser. No. 12/665,072 with filing or 35 USC 371(c) date of Dec. 17, 2009, which is the U.S. National Stage of International Application No. PCT/EP2008/005173, filed Jun. 25, 2008, which claims the benefit of German Patent Application DE 10 2007 029 203.3, filed Jun. 25, 2007; all of which are hereby incorporated by reference in their entireties to the extent not inconsistent with the disclosure herewith.

The present invention relates to a security element for security papers, value documents and the like, having a microoptical moiré-type magnification arrangement for depicting a moiré image having one or more moiré image elements.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanostructures, such as with conventional embossed holograms or other hologram-like diffraction patterns, as are described, for example, in publications EP 0 330 733 A1 and EP 0 064 067 A1.

It is also known to use lens systems as security features. For example, in publication EP 0 238 043 A2 is described a security thread composed of a transparent material on whose surface a grating composed of multiple parallel cylindrical lenses is embossed. Here, the thickness of the security thread is chosen such that it corresponds approximately to the focal length of the cylindrical lenses. On the opposing surface, a printed image is applied in perfect register, the printed image being designed taking into account the optical properties of the cylindrical lenses. Due to the focusing effect of the cylindrical lenses and the position of the printed image in the focal plane, depending on the viewing angle, different sub-areas of the printed image are visible. In this way, through appropriate design of the printed image, pieces of information can be introduced that are, however, visible only from certain viewing angles. Through the appropriate development of the printed image, also "moving" pictures can, indeed, be created. However, when the document is turned about an axis that runs parallel to the cylindrical lenses, the motif moves only approximately continuously from one location on the security thread to another location.

From publication U.S. Pat. No. 5,712,731 A is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results that, in this case, appears as a magnified and, if applicable, rotated image of the repeated elements of the image grid.

Based on that, it is the object of the present invention to avoid the disadvantages of the background art and especially to specify a security element having a microoptical moiré-type magnification arrangement that offers great freedom in the design of the motif images to be viewed.

This object is solved by the security element having the features of the main claim. A method for manufacturing such a security element, a security paper and a data carrier having such a security element are specified in the coordinated claims. Developments of the present invention are the subject of the dependent claims.

According to the present invention, a generic security element includes a microoptical moiré-type magnification arrangement having a motif image that includes a periodic or at least locally periodic arrangement of a plurality of lattice cells having micromotif image portions, for the moiré-magnified viewing of the motif image, a focusing element grid that is arranged spaced apart from the motif image and that includes a periodic or at least locally periodic arrangement of a plurality of lattice cells having one microfocusing element each, wherein, taken together, the micromotif image portions of multiple spaced-apart lattice cells of the motif image each form one micromotif element that corresponds to one of the moiré image elements of the magnified moiré image and whose dimension is larger than one lattice cell of the motif image.

In the context of this application, the term "moiré magnification arrangement" denotes embodiments in which the micromotif elements are identical to one another, are arranged regularly in the form of a lattice and, with their size, fit in a lattice cell. Here, the production of a moiré image from a plurality of regularly arranged, identical micromotif elements takes place according to the above-described principle of moiré magnification.

In the context of this application, the more general term "moiré-type magnification arrangement" denotes embodiments in which the micromotif element to be depicted can also be larger than one lattice cell of the motif image. The term "moiré-type magnification arrangement" thus encompasses the more particular moiré magnification arrangements. Here, the phrase that the dimension of the micromotif element is greater than one lattice cell of the motif image expresses the fact that, in its chosen or calculated orientation, the micromotif element does not fit within a lattice cell of the motif image, likewise viewed in the chosen or calculated orientation, such that, in general, in the event of a periodic repeat of the micromotif element, overlaps of adjacent micromotif elements can occur in the lattice cells. A micromotif element and a moiré image element correspond to each other if they transition into one another precisely through the imaging effected by the magnification arrangement, which can comprise the magnification, rotation, mirroring and shear mapping of the image element. This imaging can be specified, for example, by the transformation matrix A of the magnification arrangement described in greater detail below.

While conventional designs are limited to motif images having motif image elements that fit in a lattice cell of the motif grid, the measure according to the present invention permits, with moiré-type magnification arrangements, also motif image elements that are larger than one lattice cell to be depicted overlap-free in the moiré image. This gives the designer significantly greater design freedom in creating moiré motifs, since he is no longer strictly bound to the shape and size of the lattice cells of the motif grid. Furthermore, in this way, for a given total thickness of the magnification arrangement, particularly expansive moiré image elements are made possible in the first place.

On the other hand, with the aid of the distribution of a given motif element to multiple lattice cells, especially particularly thin magnification arrangements are manufactured. For technical reasons, the thickness of a moiré magnification arrangement corresponds namely to approximately the line screen of the motif grid used. Since, in conventional designs, the motif elements must each fit in one lattice cell, the thickness of the moiré magnification arrangement cannot be smaller than the smallest possible technically realizable motif size. This obstacle is overcome by the inventive distribution of a given motif element to multiple lattice cells.

For example, a motif element of the dimension a customarily requires a lattice cell of at least size a, and thus, due to general considerations, requires a thickness of the moiré magnification arrangement likewise on the order of a; in a concrete exemplary embodiment, the thickness be, for example, a minimum of 1.5*a. According to the present invention, with the half line screen a/2, the same motif element can be distributed to four lattice cells such that the thickness of the moiré-type magnification arrangement can be reduced to a value on the order of a/2, so in the cited exemplary embodiment, to a thickness of 1.5*a/2. In the case of a distribution to a larger number of lattice cells, the thickness can, of course be reduced even further.

Here, in a variant of the present invention, both the lattice cells of the motif image and the lattice cells of the focusing element grid are arranged periodically. Here, the periodicity length is especially between 3 µm and 50 µm, preferably between 5 µm and 30 µm, particularly preferably between about 10 µm and about 20 µm.

According to another variant of the present invention, locally, both the lattice cells of the motif image and the lattice cells of the focusing element grid are arranged periodically, the local period parameters changing only slowly in relation to the periodicity length. For example, the local period parameters can be periodically modulated across the expanse of the security element, the modulation period being especially at least 20 times, preferably at least 50 times, particularly preferably at least 100 times greater than the local periodicity length. In this variant, too, the local periodicity length is especially between 3 µm and 50 µm, preferably between 5 µm and 30 µm, particularly preferably between about 10 µm and about 20 µm.

The lattice cells of the motif image and the lattice cells of the focusing element grid advantageously each form, at least locally, a two-dimensional Bravais lattice, preferably a Bravais lattice having low symmetry, such as a parallelogram lattice. The use of Bravais lattices having low symmetry offers the advantage that moiré-type magnification arrangements having such Bravais lattices are very difficult to imitate since, for the creation of a correct image upon viewing, the very difficult-to-analyze low symmetry of the arrangement must be reproduced exactly. Furthermore, the low symmetry creates great freedom for differently chosen lattice parameters that can thus be used as a hidden identifier for protected products according to the present invention without this being, for a viewer, easily perceptible in the moiré-magnified image. On the other hand, all attractive effects that are realizable with higher-symmetry moiré magnification arrangements can also be realized with the preferred low-symmetry moiré-type magnification arrangements.

The lateral dimensions of the lattice cells of the motif image and the lattice cells of the focusing element grid are preferably below about 100 µm, preferably between about 5 µm and about 50 µm, particularly preferably between about 10 µm and about 35 µm.

The microfocusing elements are preferably formed by non-cylindrical microlenses, especially by microlenses having a circular or polygonally delimited base area. In other embodiments, the microfocusing elements can also be formed by elongated cylindrical lenses whose dimension in the longitudinal direction measures more than 250 µm, preferably more than 300 µm, particularly preferably more than 500 µm and especially more than 1 mm.

In further preferred designs, the microfocusing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

The total thickness of the security element is advantageously below 50 µm, preferably below 30 µm and particularly preferably below 20 µm. Through the distribution according to the present invention, even still thinner designs having a total thickness of about 10 µm or less are possible, or even having a total thickness of about 5 µm or less.

The micromotif image portions preferably form micromotif elements in the form of microcharacters or micropatterns and can especially be present in an embossed or printed layer.

In a second aspect, the present invention includes a generic security element having a microoptical moiré-type magnification arrangement for depicting a moiré image having multiple moiré image elements, having
  a motif image that includes a periodic or at least locally periodic arrangement of a plurality of lattice cells having micromotif elements, each micromotif element corresponding to one of the moiré image elements,
  for the moiré-magnified viewing of the motif image, a focusing element grid that is arranged spaced apart from the motif image and that includes a periodic or at least locally periodic arrangement of a plurality of lattice cells having one microfocusing element each,
wherein the motif image is broken down into areal regions that are each allocated to one of the moiré image elements and correspond in position and size to the allocated moiré image element, and wherein the micromotif elements corresponding to a moiré image element are each arranged repeatedly in the areal region of the motif image that is allocated to this moiré image element.

According to an advantageous development of the present invention, the security element exhibits, in both aspects, an opaque cover layer to cover the moiré-type magnification arrangement in some regions. Thus, within the covered region, no moiré magnification effect occurs, such that the optically variable effect can be combined with conventional pieces of information or with other effects. This cover layer is advantageously present in the form of patterns, characters or codes and/or exhibits gaps in the form of patterns, characters or codes.

In all cited variants of the present invention, the motif image and the focusing element grid are preferably arranged at opposing surfaces of an optical spacing layer. The spacing layer can comprise, for example, a plastic foil and/or a lacquer layer.

Furthermore, the arrangement of microfocusing elements can be provided with a protective layer whose refractive index preferably differs from the refractive index of the microfocusing elements by at least 0.3, in the event that refractive lenses serve as microfocusing elements. In this case, due to the protective layer, the focal length of the lenses changes, which must be taken into account when dimensioning the radii of curvature of the lenses and/or the thickness of the spacing layer. In addition to the protection against environmental effects, such a protective layer also prevents the microfocusing element arrangement from being easily cast for counterfeiting purposes.

In all aspects of the present invention, the security element itself preferably constitutes a security thread, a tear strip, a security band, a security strip, a patch or a label for application to a security paper, value document or the like. In an advantageous embodiment, the security element can span a transparent or uncovered region of a data carrier. Here, different appearances can be realized on different sides of the data carrier.

The present invention also includes a method for manufacturing a security element having a microoptical moiré-type magnification arrangement for depicting a moiré image having one or more moiré image elements, in which a motif image having a periodic or at least locally periodic arrangement of a plurality of lattice cells having micromotif image portions is produced in a motif plane a focusing element grid for the moiré-magnified viewing of the motif image, having a periodic or at least locally periodic arrangement of a plurality of lattice cells having one microfocusing element each, is produced and arranged spaced apart from the motif image, wherein, taken together, the micromotif image portions are developed such that the micromotif image portions of multiple spaced-apart lattice cells of the motif image each form one micromotif element that corresponds to one of the moiré image elements of the magnified moiré image and whose dimension is larger than one lattice cell of the motif image.

To determine such uniform motif subsets and the allocated focusing element subsets of the focusing element grid, in a preferred development of the method is provided that a) a desired moiré image that is visible when viewed, having one or more moiré image elements, is defined as the target motif, b) a periodic or at least locally periodic arrangement of microfocusing elements is defined as the focusing element grid, c) a desired magnification and a desired movement of the visible moiré image when the magnification arrangement is tilted laterally and when tilted forward/backward is defined, d) the micromotif element to be introduced into the motif plane and the motif grid is calculated from the defined magnification and movement behavior, the focusing element grid and the target motif, e) it is checked whether an arrangement of the micromotif elements repeated with the symmetry of the motif grid leads to overlapping, and if this is the case, f) uniform motif subsets of the micromotif element arrangement produced in step e) are identified in which the micromotif elements are arranged repeatedly, free of overlaps, g) uniform focusing element subsets of the focusing element grid that correspond to the motif subsets are determined and allocated to the respective motif subset, h) for each focusing element subset, the intersection of the corresponding focusing element subgrid with the associated motif subset is determined, and i) the resulting intersections are composed, in accordance with the relative position of the focusing element subset in the focusing element grid, to form the motif image to be arranged in the motif plane.

Here, it is important that the motif subsets identified in step f) not only exhibit an overlap-free depiction of the micromotif elements, but that the identified motif subsets each also form, together with the corresponding focusing element subsets of the focusing element grid, moiré-type magnification arrangements that lead to the same target motif. This is expressed by the phrase that the motif subsets identified in step f) are all to be "uniform".

In a further advantageous development of the method, it is provided that a) a desired moiré image that is visible when viewed, having one or more moiré image elements, is defined as the target motif, b) a periodic or at least locally periodic arrangement of microfocusing elements is defined as the focusing element grid, c) a desired magnification and a desired movement of the visible moiré image when the magnification arrangement is tilted laterally and when tilted forward/backward is defined, d) the micromotif element to be introduced into the motif plane and the motif grid is calculated from the defined magnification and movement behavior, the focusing element grid and the target motif, e) it is checked whether an arrangement of the micromotif elements repeated with the symmetry of the motif grid leads to overlapping, and if this is the case, f') a superlattice grid of the motif grid is identified in which the micromotif elements can be arranged repeatedly, free of overlaps, g') a superlattice grid of the focusing element grid that corresponds to the motif superlattice grid is determined and the focusing element grid is broken down into subgrids having the symmetry of the focusing element superlattice grid, h') for each focusing element subgrid, the intersection of the subgrid with an overlap-free arrangement of the micromotif elements is determined, and i') the resulting intersections are composed in accordance with the relative position of the respective subgrid in the focusing element superlattice grid to form the motif image to be arranged in the motif plane.

A superlattice grid is understood here to be a grid whose unit cell includes multiple lattice cells of the underlying basic grid. For example, the unit cell of a simple superlattice grid can comprise 2×2, 2×3 or 3×2 lattice cells of the basic grid.

Preferably, in this method, after step g'), in a step g") for each focusing element subgrid, the corresponding motif subgrid is identified and the offset of this motif subgrid with respect to the motif superlattice cell is determined, and in step h') for each focusing element subgrid, the overlap-free arrangement of the micromotif elements identified in step f) is displaced by the offset of the associated motif subgrid determined in step g"), and the intersection of the focusing element subgrid with the displaced overlap-free arrangement of the micromotif elements is determined.

In step b), the focusing element grid is expediently defined in the form of a two-dimensional Bravais lattice whose lattice cells are given by vectors $\vec{w}_1$ and $\vec{w}_2$. In step c), the desired magnification and movement behavior is advantageously specified in the form of the matrix elements of a transformation matrix $\vec{A}$. Then, in step d), the micromotif element to be introduced into the motif plane and the motif grid are advantageously calculated using the relationships $$\vec{U} = (\vec{I} - \vec{A}^{-1}) \cdot \vec{W}$$

and $$\vec{r} = \vec{A}^{-1} \cdot \vec{R} + \vec{r}_0$$

$$\vec{R} = \begin{pmatrix} X \\ Y \end{pmatrix}$$

representing an image point of the desired moiré image, $$\vec{r} = \begin{pmatrix} x \\ y \end{pmatrix}$$

an image point of the motif image, $$\vec{r}_0 = \begin{pmatrix} x_0 \\ y_0 \end{pmatrix}$$

a displacement between the focusing element grid and the motif image, and the matrices $\vec{A}$, $\vec{W}$ and the motif grating matrix $\vec{U}$ being given by $$\vec{A} = \begin{pmatrix} a_{11} & a_{12} \\ a_{21} & a_{22} \end{pmatrix},$$

$$\vec{W} = \begin{pmatrix} w_{11} & w_{12} \\ w_{21} & w_{22} \end{pmatrix}$$

and $$\vec{U} = \begin{pmatrix} u_{11} & u_{12} \\ u_{21} & u_{22} \end{pmatrix},$$

with $u_{1i}$, $u_{2i}$ and $w_{1i}$, $w_{2i}$ representing the components of the lattice cell vectors $\vec{u}_i$ and $\vec{w}_i$, where i=1,2.

In step f), preferably a motif superlattice grid is selected that consists of n×m lattice cells of the motif grid, wherein, for n and m, preferably the smallest values are chosen that permit an overlap-free arrangement of the micromotif elements. In step g'), the focusing element grid is preferably broken down into n×m subgrids.

Advantageously, in step g"), the motif grid is broken down into n×m motif subgrids and, for each motif subgrid, the offset $\vec{v}_j$ of the motif subgrid with respect to the motif superlattice cell is determined, where j=1, . . . n*m.

Further, in step h'), advantageously, for each focusing element subgrid, the overlap-free arrangement of the micromotif elements identified in step f) is displaced by the offset $\vec{v}_j$ of the associated motif subgrid, and the intersection of the focusing element subgrid with the displaced overlap-free arrangement of the micromotif elements is determined.

According to the second inventive aspect, the present invention also includes a method for manufacturing a security element having a microoptical moiré-type magnification arrangement for depicting a moiré image having multiple moiré image elements, in which a motif image having a periodic or at least locally periodic arrangement of a plurality of lattice cells having micromotif elements is produced, each micromotif element corresponding to one of the moiré image elements, a focusing element grid for the moiré-magnified viewing of the motif image, having a periodic or at least locally periodic arrangement of a plurality of lattice cells having one microfocusing element each, is produced and arranged spaced apart from the motif image, wherein the motif image is broken down into areal regions that are each allocated to one of the moiré image elements and correspond in position and size to the allocated moiré image element, and wherein the micromotif elements corresponding to a moiré image element are each arranged repeatedly in the areal region of the motif image that is allocated to this moiré image element.

In both aspects of the present invention, the lattice parameters of the Bravais lattice can be location independent. However, it is likewise possible to modulate the lattice vectors of the motif grid and the focusing element grid, $\vec{u}_1$ and $\vec{u}_2$, or $\vec{w}_1$ and $\vec{w}_2$, location dependently, the local period parameters $|\vec{u}_1|$, $|\vec{u}_2|$, $\angle(\vec{u}_1, \vec{u}_2)$ and $|\vec{w}_1|$, $|\vec{w}_2|$, $\angle(\vec{w}_1, \vec{w}_2)$ changing, according to the present invention, only slowly in relation to the periodicity length. In this way it is ensured that, locally, the arrangements can always be reasonably described by Bravais lattices.

A security paper for manufacturing security or value documents, such as banknotes, checks, identification cards or the like, is preferably furnished with a security element of the kind described above. The security paper can especially comprise a carrier substrate composed of paper or plastic.

The present invention also includes a data carrier, especially a branded article, a value document, a decorative article, such as packaging, postcards or the like, having a security element of the kind described above. Here, the security element can especially be arranged in a window region, that is, a transparent or uncovered region of the data carrier.

Further exemplary embodiments and advantages of the present invention are described below with reference to the drawings. To improve clarity, a depiction to scale and proportion was dispensed with in the drawings.

Figure 2:
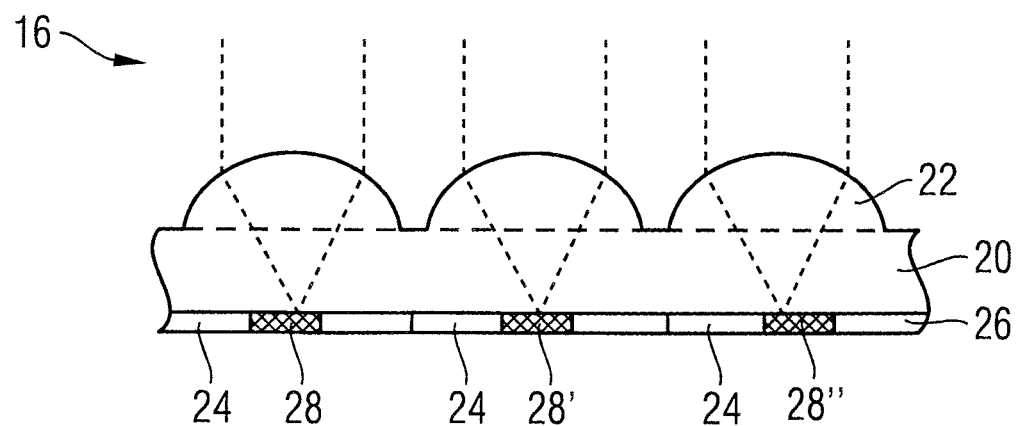
Figure 3:
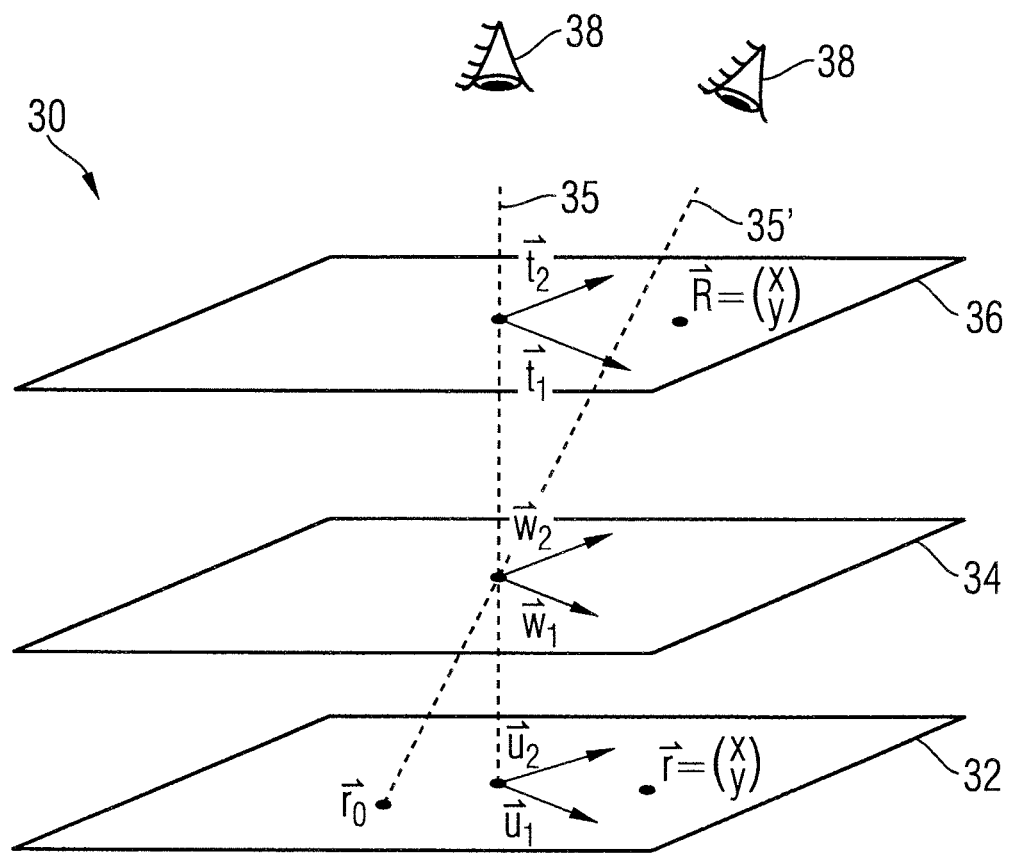
Figure 4A:
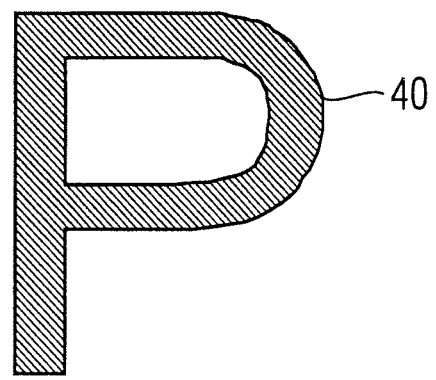
Figure 4B:
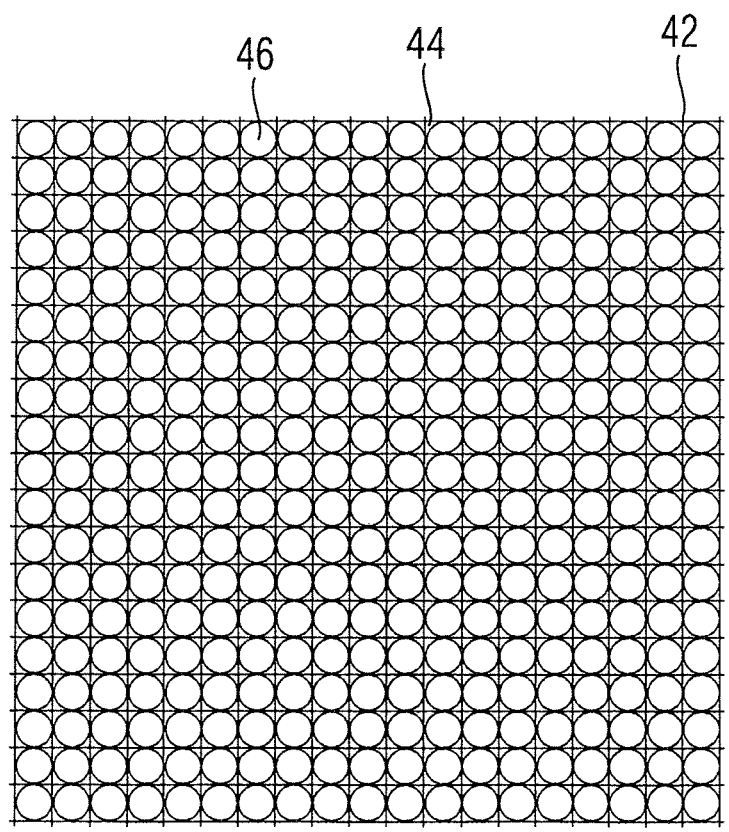
Figure 5A:
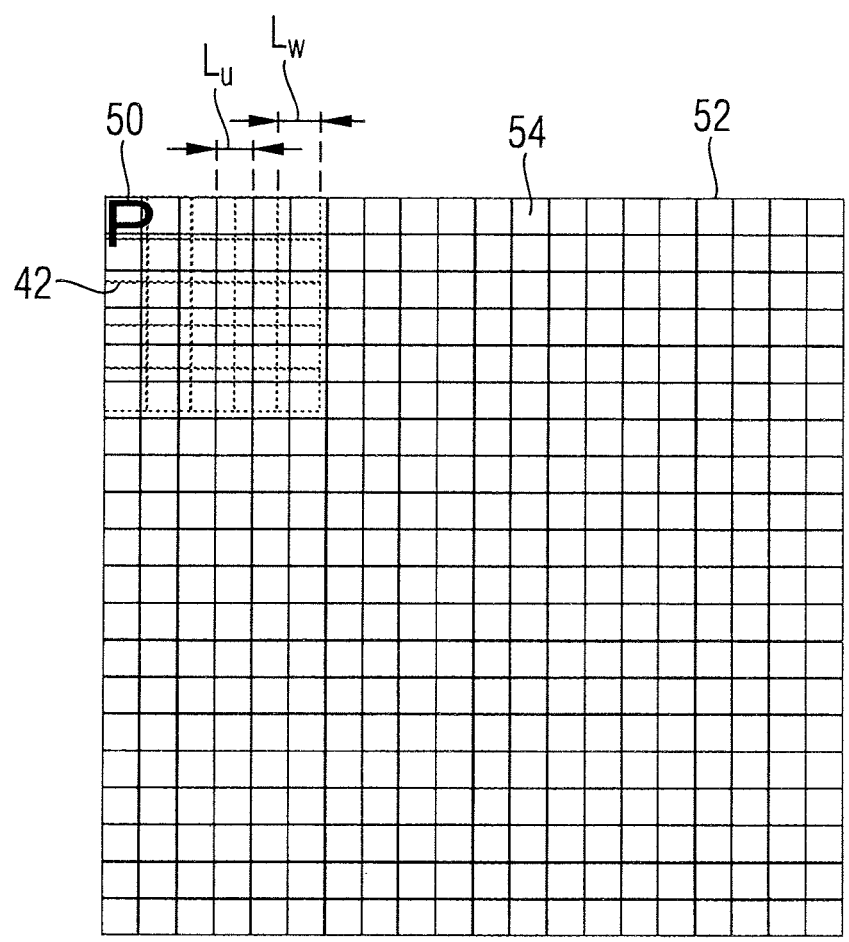
Figure 5B:
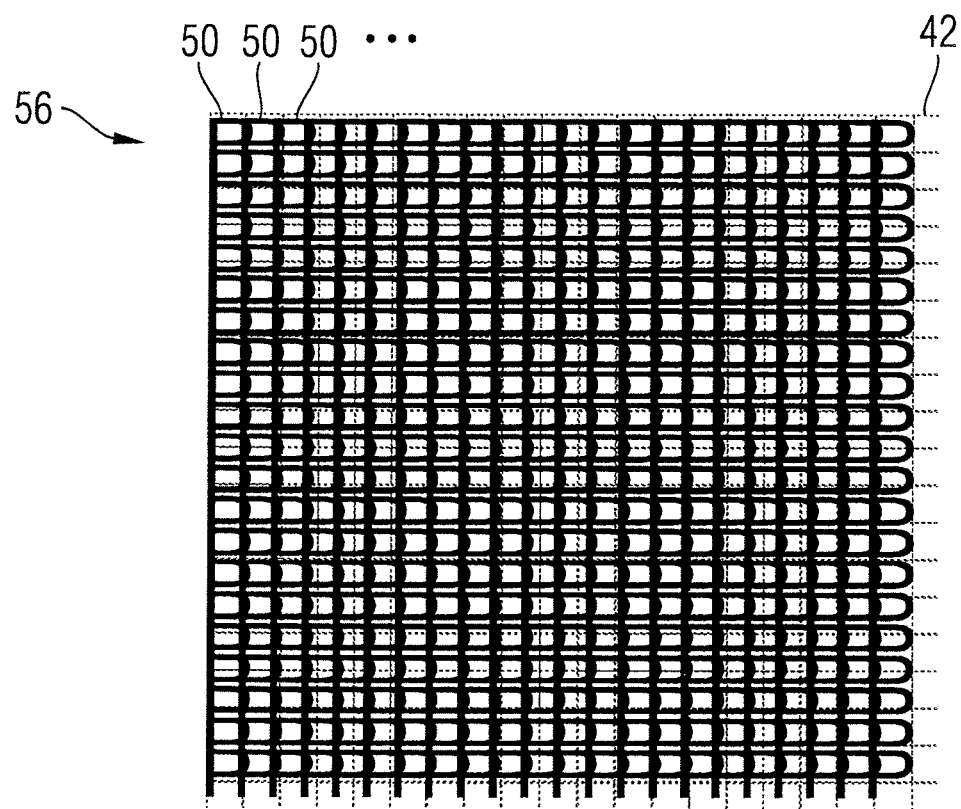
Figure 6A:
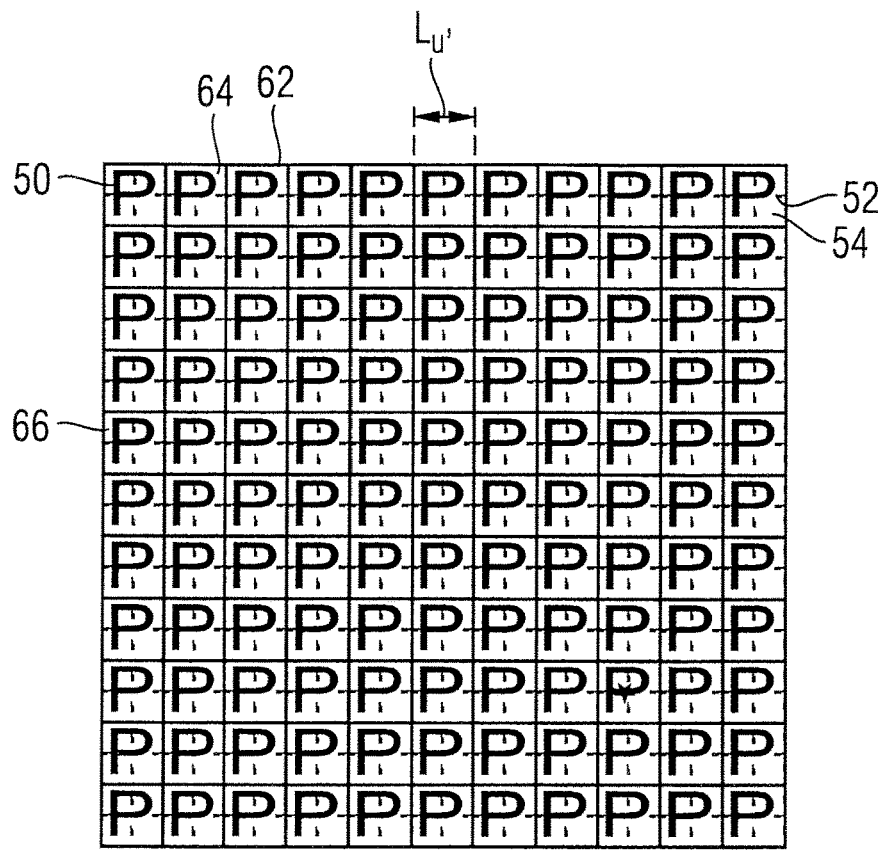
Figure 6B:
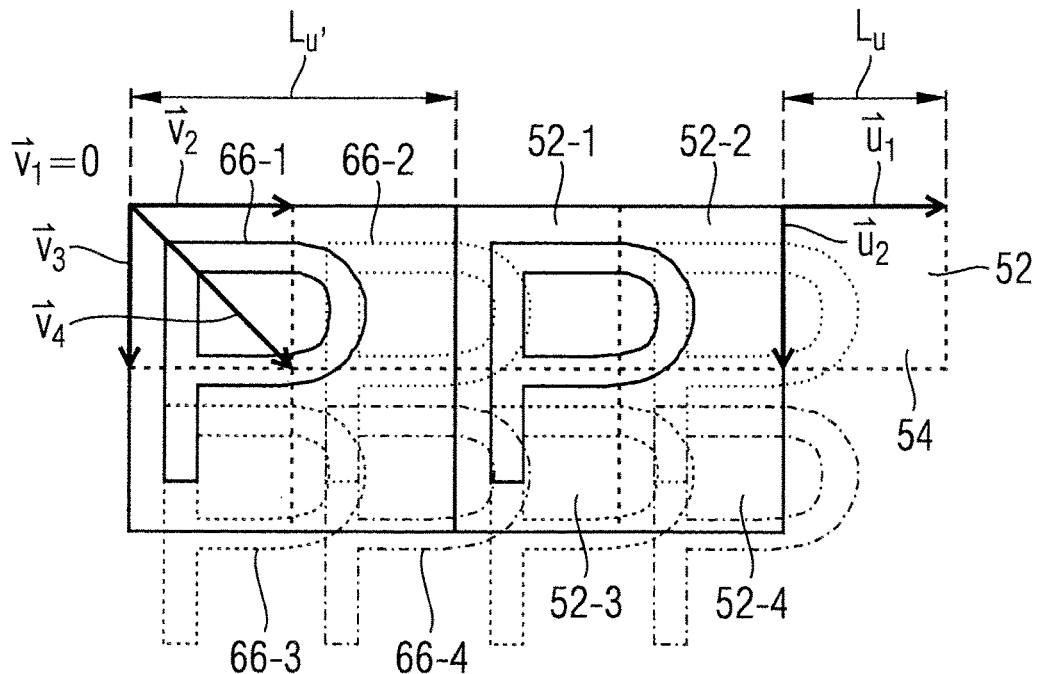
Figure 7A:
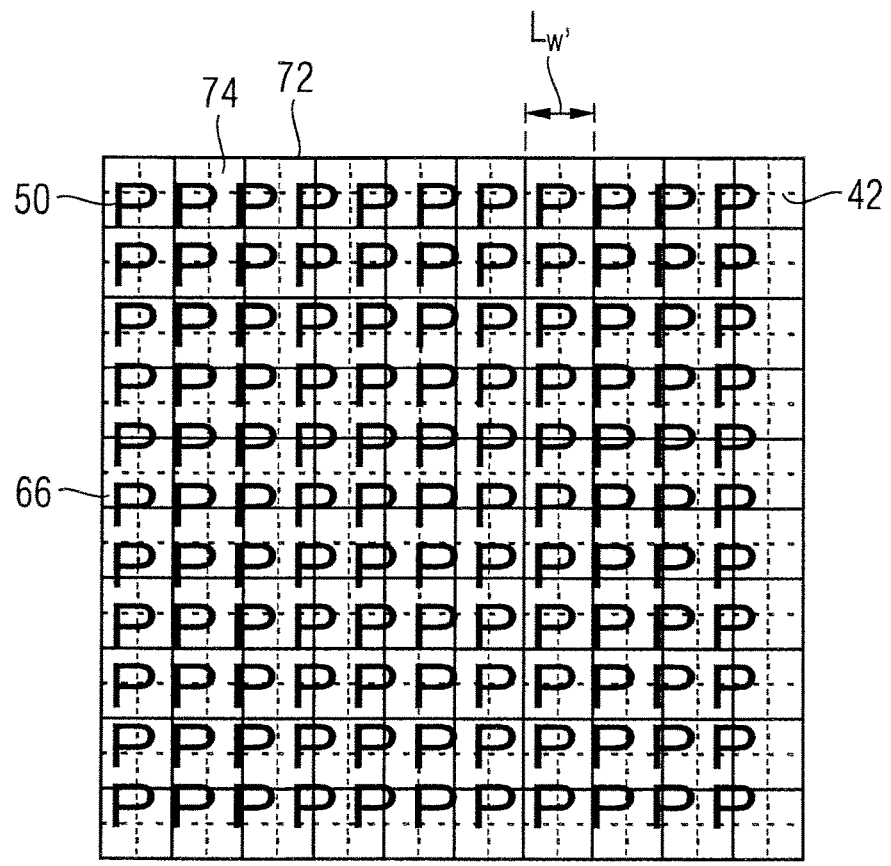
Figure 8A:
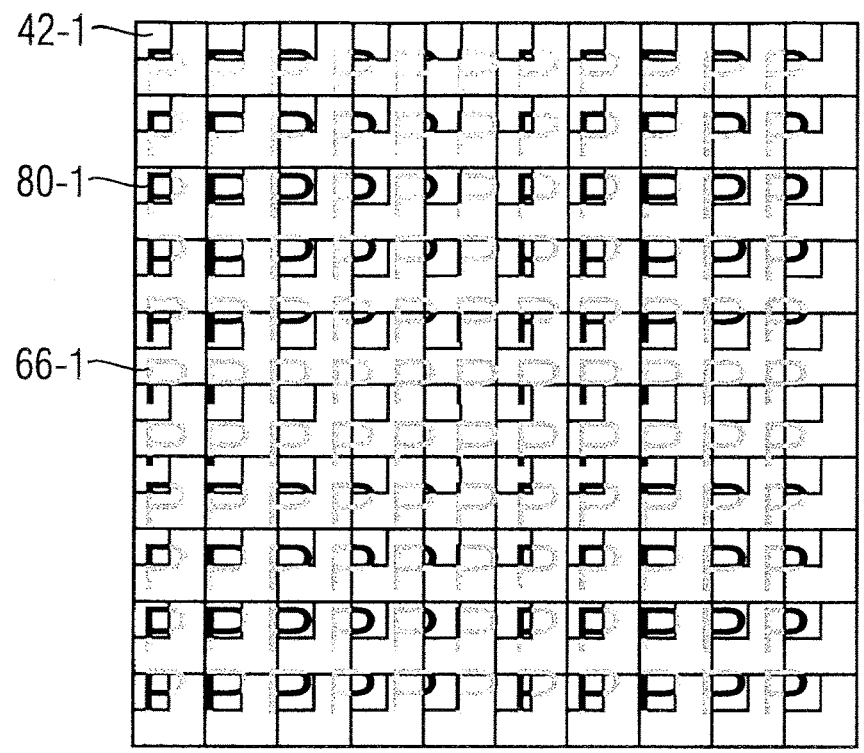
Figure 8B:
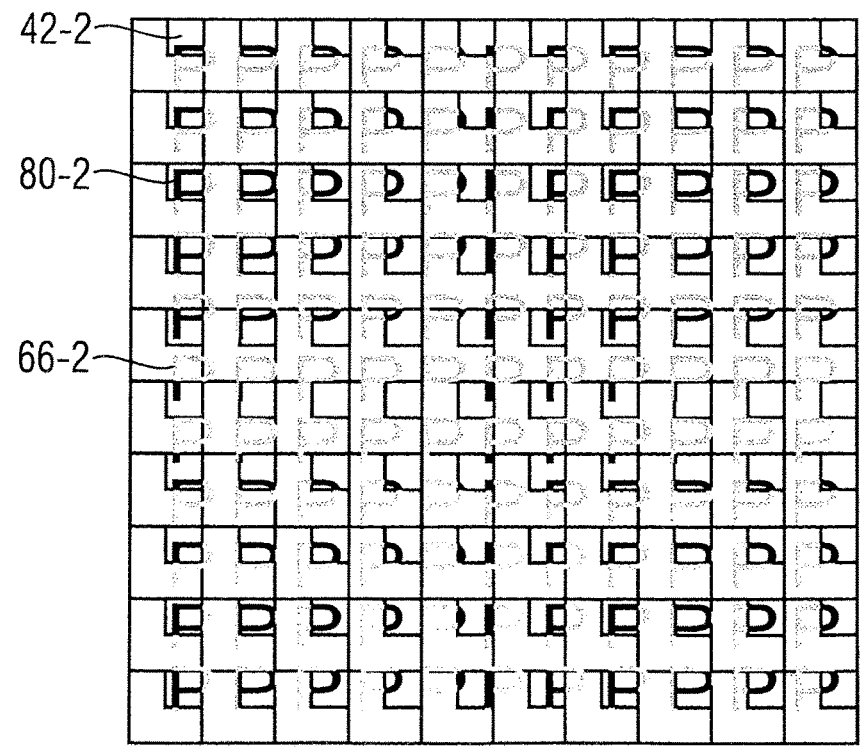
Figure 8C:
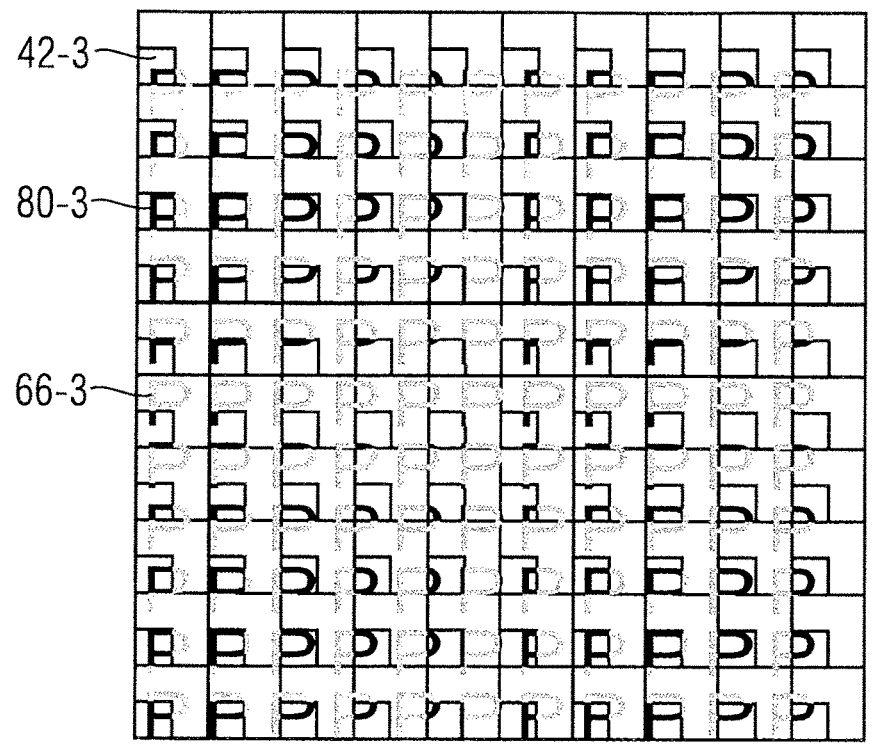
Figure 8D:
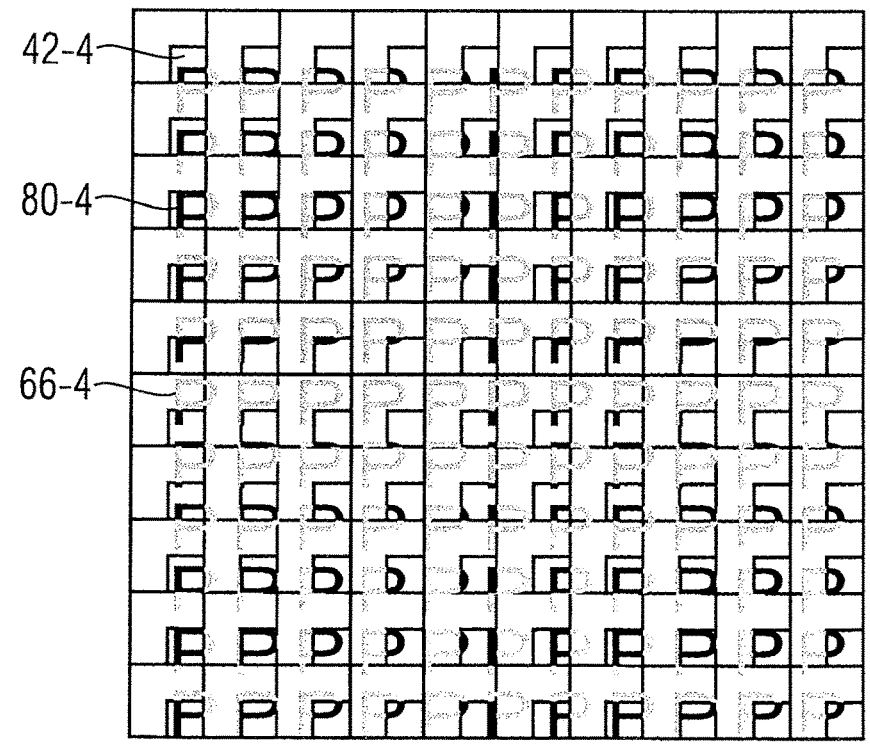
Figure 8E:
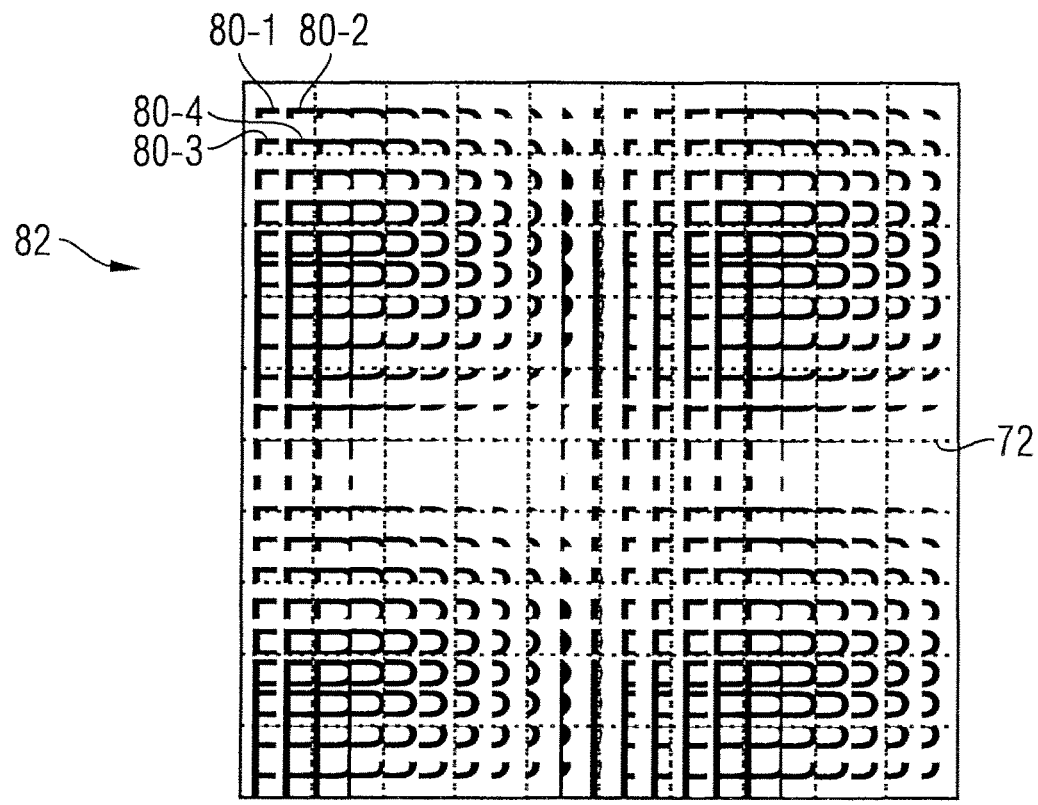
Figure 8F:
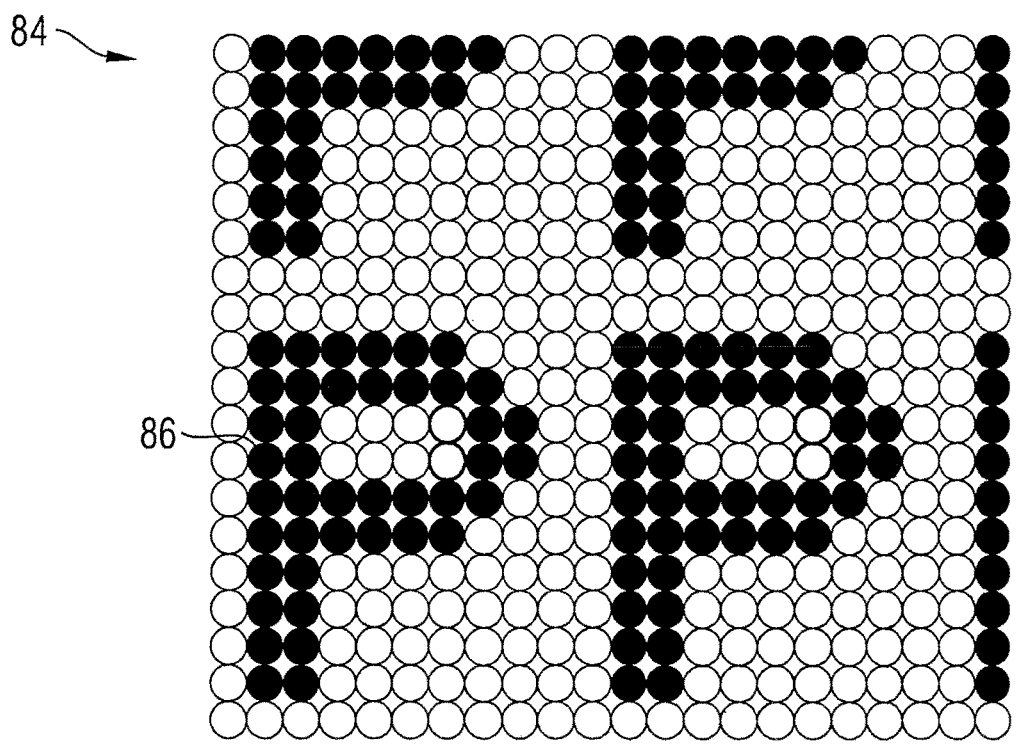
Figure 9:
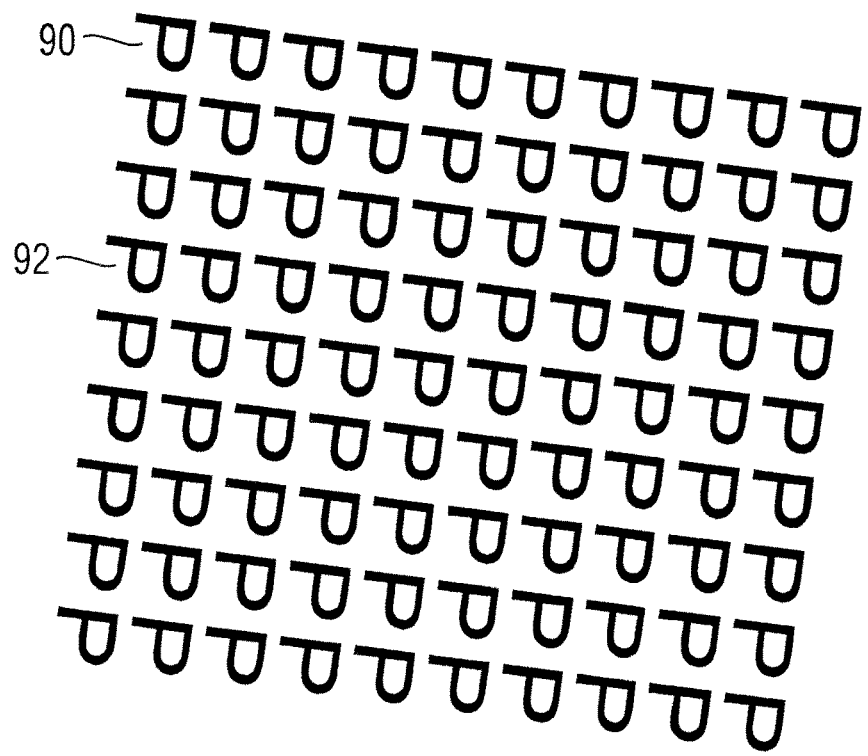
Figure 10:
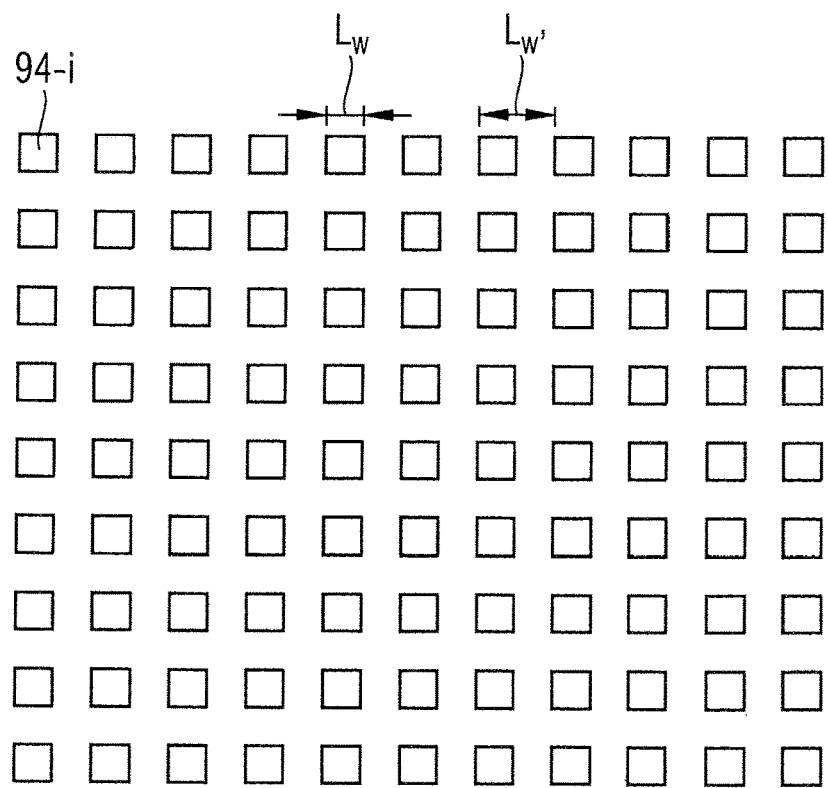
Figure 11:
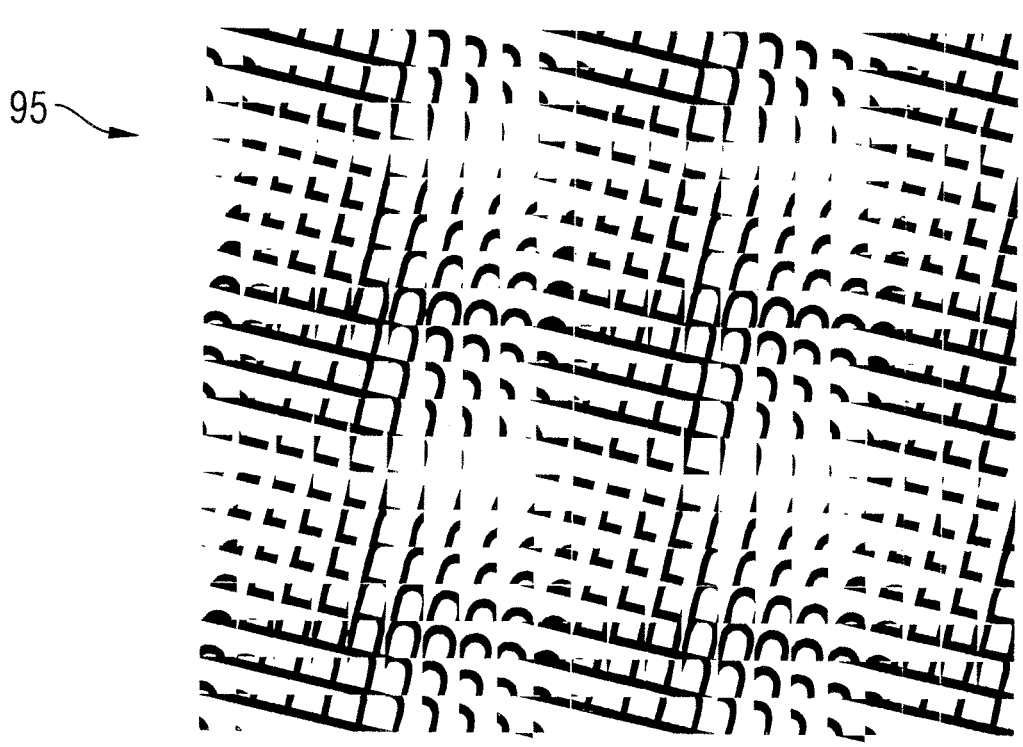
Figure 12:
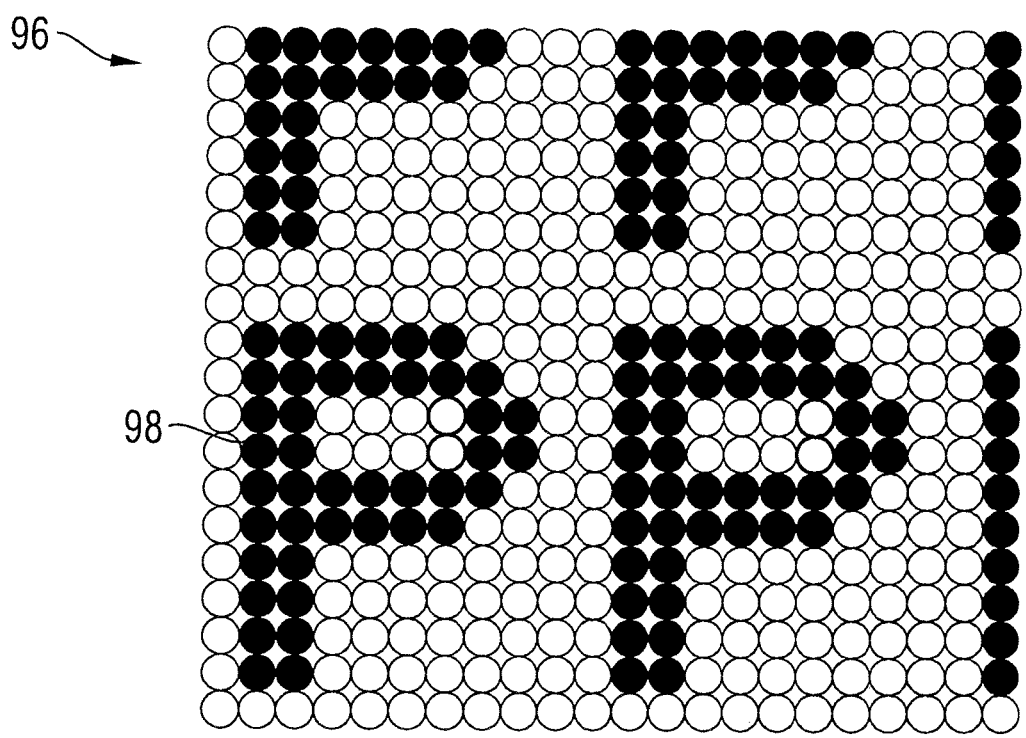
Figure 13A:
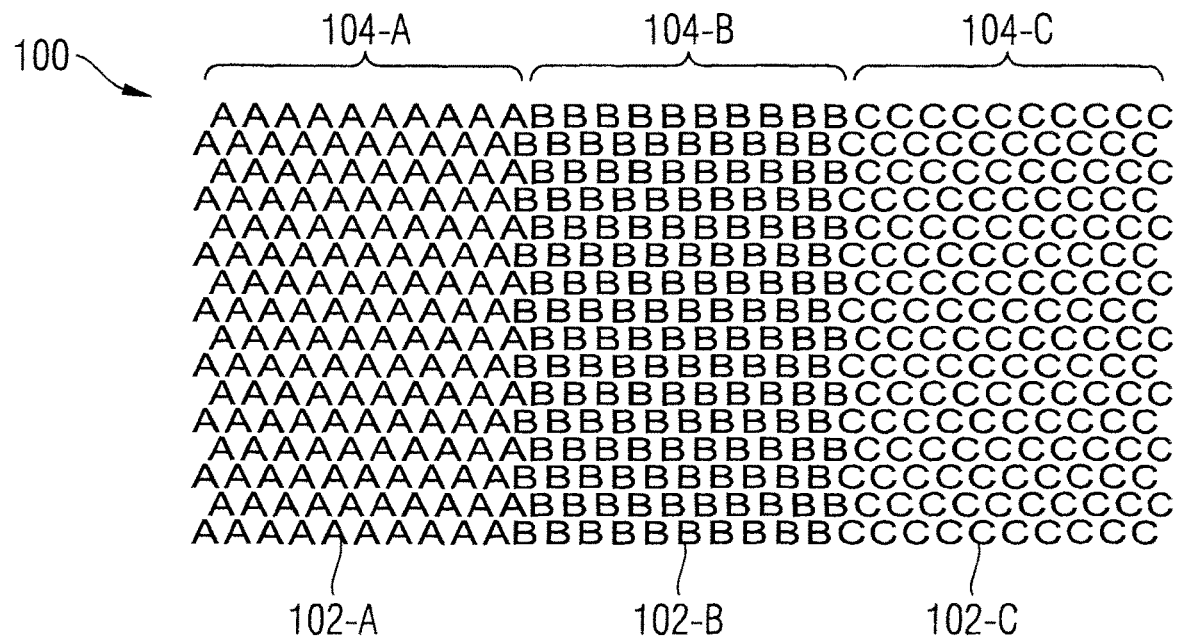
Figure 13B:
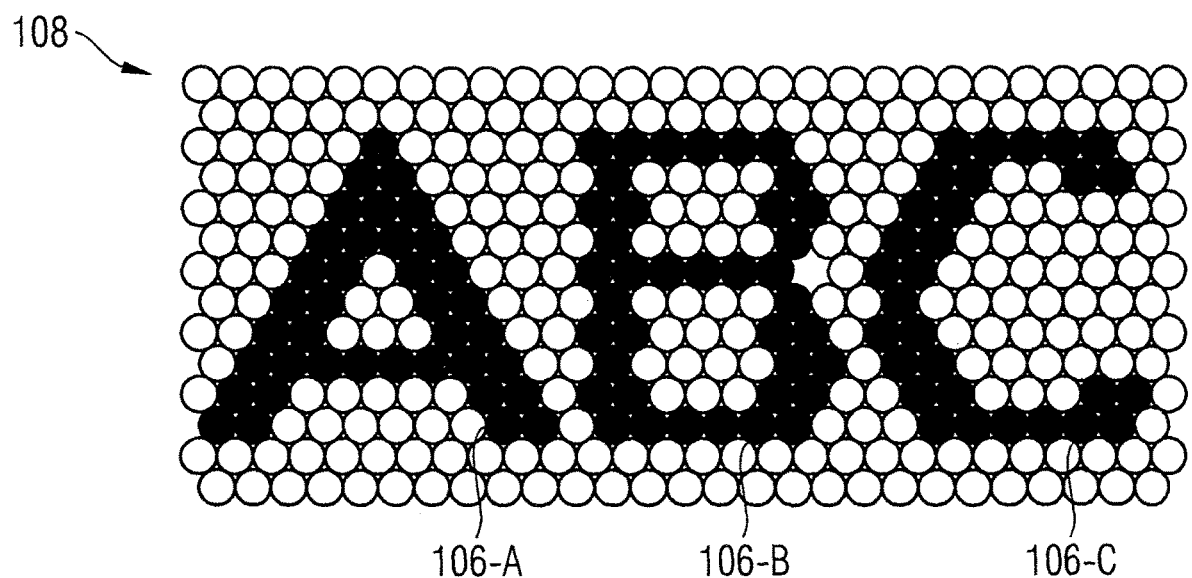
Figure 14A:
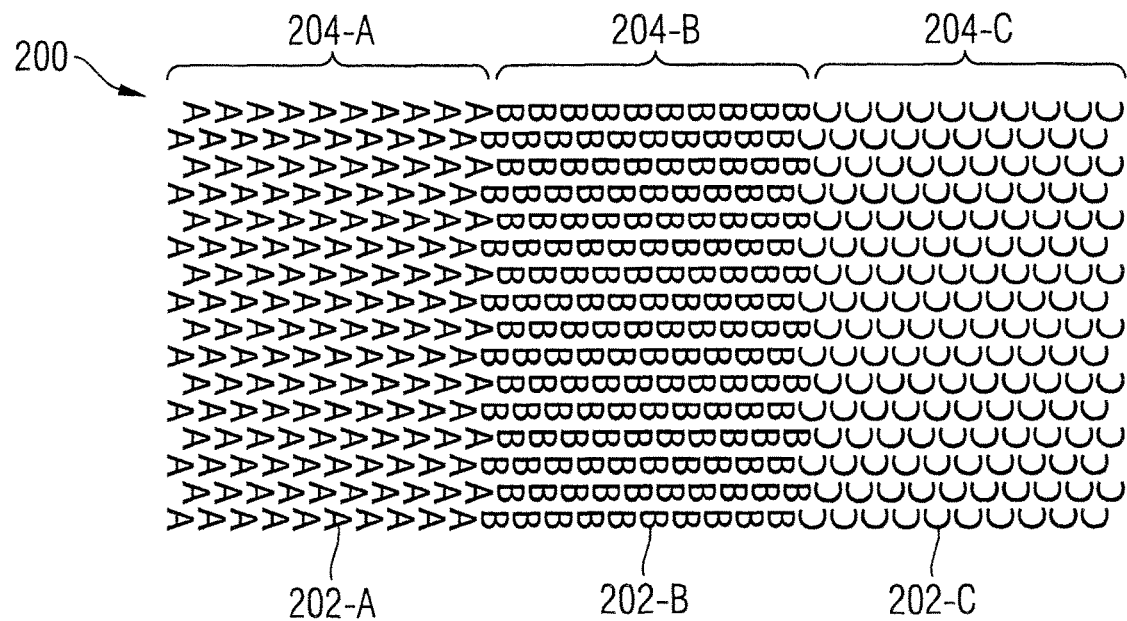
Figure 14B:
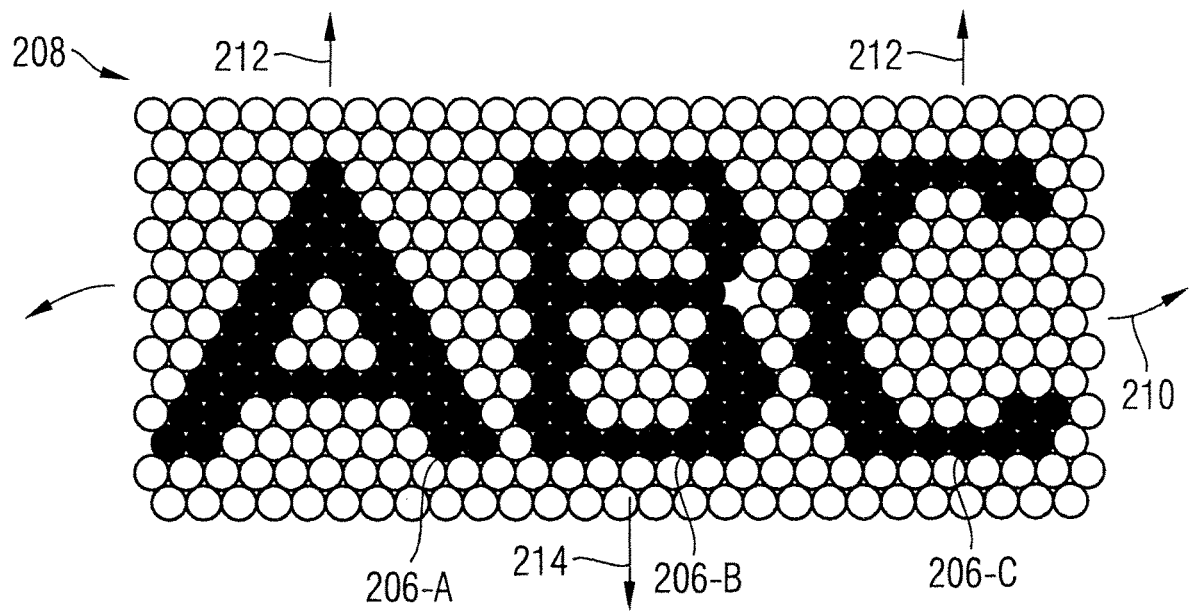

Shown are:

FIG. 1 a schematic diagram of a banknote having an embedded security thread and an affixed transfer element, FIG. 2 schematically, the layer structure of a security element according to the present invention, in cross section, FIG. 3 schematically, the relationships when viewing a moiré-type magnification arrangement, to define the occurring variables, FIG. 4 in (a), a specified target motif in the form of the letter "P", and in (b), a specified lens array having a square lens grid, FIG. 5 in (a), the calculated micromotif element to be introduced repeatedly into the motif grid, the motif grid and a portion of the lens grid, and in (b), the overlapping micromotif elements arranged repeatedly in a conventional manner, FIG. 6 in (a), a motif superlattice grid whose lattice cells each consist of 2×2 lattice cells of the motif grid drawn in with dotted lines, as well as a non-overlapping arrangement of the micromotif elements that is repeated with the periodicity length of the superlattice grid, and in (b), the motif superlattice grid, the motif grid drawn in with dotted lines, and four uniform, non-overlapping motif subsets, in detail, FIG. 7 in (a), the non-overlapping arrangement of the micromotif elements of FIG. 6(a) together with a lens superlattice grid corresponding to the motif superlattice grid, and in (b), the lens superlattice grid and the lens grid drawn in with dotted lines, in detail, FIG. 8 in each of (a) to (d), a non-overlapping arrangement of the micromotif elements (gray), a subgrid of the lens grid and the motif image portions (black) cut out when intersecting this subgrid with the motif element arrangement, in (e), the sectional images from steps (a) to (d) composed to form a motif image, and in (f), the magnified moiré image resulting upon viewing the motif image (e) with the lens array in FIG. 4(b), FIG. 9 for a further exemplary embodiment, a non-overlapping arrangement of micromotif elements within a motif superlattice that consists of 2×2 lattice cells, FIG. 10 a subgrid of the lens grid having the symmetry of a lens superlattice grid that corresponds to the motif superlattice grid in FIG. 9, FIG. 11 the finished motif image, composed of the four sectional images of the four lens subgrids having suitably displaced overlap-free arrangements of the micromotif elements, FIG. 12 the magnified moiré image resulting upon viewing the motif image in FIG. 11 with the lens array in FIG. 4(b), FIG. 13 in (a), a motif layer composed of motifs "A", "B", "C" that, combined with the appropriate lens grid, yields the magnified moiré image shown in (b), FIG. 14 a depiction like FIG. 13 for an exemplary embodiment in which the (a) letter motifs "A", "B", "C" move in different directions upon tilting the moiré-type magnification arrangement (b), and FIG. 15 an exemplary embodiment having a long motif element "B", (a) showing the distorted motif element together with the lens grid, (b) showing the motif image and (c) the resulting moiré image in the conventional approach, and (d) and (e) showing the motif image and the moiré image in the approach according to the present invention.

The invention will now be explained using a security element for a banknote as an example. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote. The security element can be designed for viewing in top view, looking through, or for viewing both in top view and looking through. Also two-sided designs can be used in which lens grids are arranged on both sides of a motif image.

Both the security thread 12 and the transfer element 16 can include a moiré-type magnification arrangement according to an exemplary embodiment of the present invention. The operating principle and the inventive manufacturing method for such arrangements are described in greater detail in the following based on the transfer element 16.

FIG. 2 shows schematically the layer structure of the transfer element 16, in cross section, with only the portions of the layer structure that are required to explain the functional principle being depicted. The transfer element 16 includes a substrate 20 in the form of a transparent plastic foil, in the exemplary embodiment a polyethylene terephthalate (PET) foil about 20 µm thick.

The top of the substrate foil 20 is provided with a grid-shaped arrangement of microlenses 22 that form, on the surface of the substrate foil, a two-dimensional Bravais lattice having a prechosen symmetry. The Bravais lattice can exhibit, for example, a hexagonal lattice symmetry, but due to the higher counterfeit security, lower symmetries, and thus more general shapes, are preferred, especially the symmetry of a parallelogram lattice.

The spacing of adjacent microlenses 22 is preferably chosen to be as small as possible in order to ensure as high an areal coverage as possible and thus a high-contrast depiction. The spherically or aspherically designed microlenses 22 preferably exhibit a diameter between 5 µm and 50 µm and especially a diameter between merely 10 µm and 35 µm and are thus not perceptible with the naked eye. It is understood that, in other designs, also larger or smaller dimensions may be used. For example, in the case of moiré magnifier patterns, the microlenses can exhibit, for decorative purposes, a diameter between 50 µm and 5 mm, while in moiré magnifier patterns that are to be decodable only with a magnifier or a microscope, also dimensions below 5 µm can be used.

On the bottom of the substrate foil 20, a motif layer 26 is arranged that includes a likewise grid-shaped arrangement of a plurality of lattice cells 24 having different micromotif image portions 28, 28', 28". As explained in greater detail below, taken together, the micromotif image portions of multiple spaced-apart lattice cells (24) of the motif layer (26) each form one micromotif element that corresponds to one of the moiré image elements of the magnified moiré image and whose dimension is larger than one lattice cell (24) of the motif image.

The arrangement of the lattice cells 24 likewise forms a two-dimensional Bravais lattice having a prechosen symmetry, a parallelogram lattice again being assumed for illustration. As indicated in FIG. 2 through the offset of the lattice cells 24 with respect to the microlenses 22, the Bravais lattice of the lattice cells 24 differs slightly in its symmetry and/or in the size of its lattice parameters from the Bravais lattice of the microlenses 22 to produce the desired moiré magnification effect. Here, the lattice period and the diameter of the lattice cells 24 are on the same order of magnitude as those of the microlenses 22, so preferably in the range from 5 µm to 50 µm and especially in the range from 10 µm to 35 µm, such that also the micromotif image portions 28, 28', 28" are not perceptible even with the naked eye. In designs having the above-mentioned larger or smaller microlenses, of course also the lattice cells 24 are developed to be a larger or smaller, accordingly.

The optical thickness of the substrate foil 20 and the focal length of the microlenses 22 are coordinated with each other such that the motif layer 26 is located approximately the lens focal length away. The substrate foil 20 thus forms an optical spacing layer that ensures a desired constant spacing of the microlenses 22 and of the motif layer having the micromotif image portions 28, 28', 28".

Due to the slightly differing lattice parameters, the viewer sees, in each case, when viewing from above through the microlenses 22, a somewhat different sub-region of the micromotif image portions 28, 28', 28", such that, overall, the plurality of microlenses 22 produces a magnified image of the micromotif elements formed from the micromotif image portions. Here, the resulting moiré magnification depends on the relative difference between the lattice parameters of the Bravais lattices used. If, for example, the grating periods of two hexagonal lattices differ by 1%, then a 100× moiré magnification results. For a more detailed description of the operating principle and for advantageous arrangements of the motif grids and the microlens grids, reference is made to German patent application 10 2005 062 132.5 and international application PCT/EP2006/012374, the disclosures of which are incorporated herein by reference.

Now, the distinctive feature of the present invention consists in that the micromotif elements of the motif layer 26 that correspond to the moiré image elements of the magnified moiré image are larger than the dimension of a lattice cell 24 of the motif layer 26 and thus, due to the occurring overlaps, can not simply be arranged periodically repeated in the motif layer. Rather, according to the present invention, the micromotif elements are broken down in a suitable manner into micromotif image portions that are each accommodated within one of multiple spaced-apart lattice cells 24 and that, taken together, form the respective micromotif element. Here, the breakdown of a micromotif element into micromotif image portions and the distribution of the image portions to lattice cells must be done according to certain rules if the image portions are to be composed, correctly and without gaps, to form a high-contrast, magnified moiré image element for the viewer.

With the described breakdown of larger motifs according to the present invention, especially particularly thin moiré magnifiers can be manufactured: for technical reasons, the thickness of a moiré magnifier arrangement is approximately equal to the line screen of the motif grid. Since, according to the background art, the motifs must each fit in a motif lattice cell, customarily, it is not possible to make the thickness smaller than the smallest possible technically realizable motif size. This obstacle is overcome according to the present invention in that the motif extends across multiple lattice cells.

For example, there is a method in the background art to produce motifs that are just 10 μm in size and suitable for moiré magnifiers; the resolution of the method is not sufficient for smaller motifs. Such a 10 μm motif just fits in a 10 μm grid such that, customarily, no moiré magnifiers that are thinner than 10 μm can be manufactured with this method. According to the present invention, however, a 10 μm motif can be accommodated broken down into four lattice cells of a 5 μm grid, and a 5-μm-thin moiré magnifier thus manufactured. Of course, the 10 μm motif according to the present inventive method can also be accommodated broken down into more than four lattice cells and, in this way, practically arbitrarily thin moiré magnifiers manufactured.

To explain the approach according to the present invention, the required variables will first be defined and briefly described with reference to FIG. 3. For a more precise description, reference is additionally made to the already cited German patent application 10 2005 062 132.5 and the international application PCT/EP2006/012374, the disclosures of which are incorporated herein by reference.

FIG. 3 shows schematically a moiré-type magnification arrangement 30, which is not depicted to scale, having a motif plane 32 in which the motif image having the micromotif image components is arranged and having a lens plane 34 in which the microlens grid is located. The moiré-type magnification arrangement 30 produces a moiré image plane 36 in which the magnified moiré image perceived by the viewer 38 is described.

The arrangement of the micromotif image portions in the motif plane 32 is described by a two-dimensional Bravais lattice whose unit cell can be represented by vectors $\vec{u}_1$ and $\vec{u}_2$ (having the components $u_{11}$, $u_{21}$ and $u_{12}$, $u_{22}$). In compact notation, the unit cell can also be specified in matrix form by a motif grid matrix $\vec{U}$ (below also often simply called motif grid):

$$\vec{U} = (\vec{u}_1, \vec{u}_2) = \begin{pmatrix} u_{11} & u_{12} \\ u_{21} & u_{22} \end{pmatrix}.$$

In the same way, the arrangement of microlenses in the lens plane 34 is described by a two-dimensional Bravais lattice whose unit cell is specified by the vectors $\vec{w}_1$ and $\vec{w}_2$ (having the components $w_{11}$, $w_{21}$ and $w_{12}$, $w_{22}$). The unit cell in the moiré image plane 36 is described with the vectors $\vec{t}_1$ and $\vec{t}_2$ (having the components $t_{11}$, $t_{21}$ and $t_{12}$, $t_{22}$).

$$\vec{r} = \begin{pmatrix} x \\ y \end{pmatrix}$$

designates a general point in the motif plane 32, $$\vec{R} = \begin{pmatrix} X \\ Y \end{pmatrix}$$

a general point in the moiré image plane 36. To be able to describe, in addition to vertical viewing (viewing direction 35), also non-vertical viewing directions of the moiré-type magnification arrangement, such as the general direction 35', between the lens plane 34 and the motif plane 32 is additionally permitted a displacement that is specified by a displacement vector $$\vec{r}_0 = \begin{pmatrix} x_0 \\ y_0 \end{pmatrix}$$

in the motif plane 32. Analogously to the motif grid matrix, the matrices $$\vec{W} = \begin{pmatrix} w_{11} & w_{12} \\ w_{21} & w_{22} \end{pmatrix}$$

(referred to as the lens grid matrix or simply lens grid) and $$\vec{T} = \begin{pmatrix} t_{11} & t_{12} \\ t_{21} & t_{22} \end{pmatrix}$$

are used for the compact description of the lens grid and the image grid.

In the lens plane 34, in place of lenses 22, also, for example, circular apertures can be used, according to the principle of the pinhole camera. Also all other types of lenses and imaging systems, such as aspherical lenses, cylindrical lenses, slit apertures, circular or slit apertures provided with reflectors, Fresnel lenses, GRIN lenses (Gradient Refractive Index), zone plates (diffraction lenses), holographic lenses, concave reflectors, Fresnel reflectors, zone reflectors and other elements having a focusing or also a masking effect, can be used as microfocusing elements in the focusing element grid.

In principle, in addition to elements having a focusing effect, also elements having a masking effect (circular or slot apertures, also reflector surfaces behind circular or slot apertures) can be used as microfocusing elements in the focusing element grid.

When a concave reflector array is used, and with other reflecting focusing element grids used according to the present invention, the viewer looks through the in this case partially transmissive motif image at the reflector array lying therebehind and sees the individual small reflectors as light or dark points of which the image to be depicted is made up. Here, the motif image is generally so finely patterned that it can be seen only as a fog. The formulas described for the relationships between the image to be depicted and the moiré image apply also when this is not specifically mentioned, not only for lens grids, but also for reflector grids. It is understood that, when concave reflectors are used according to the present invention, the reflector focal length takes the place of the lens focal length.

If, in place of a lens array, a reflector array is used according to the present invention, the viewing direction in FIG. 2 is to be thought from below, and in FIG. 3, the planes 32 and 34 in the reflector array arrangement are interchanged. The further description of the present invention is based on lens grids, which stand representatively for all other focusing element grids used according to the present invention.

The moiré image lattice results from the lattice vectors of the motif plane 32 and the lens plane 36 in $$\vec{T} = \vec{W} \cdot (\vec{W} - \vec{U})^{-1} \vec{U}$$

and the image points of the moiré image plane 36 can be determined with the aid of the relationship $$\vec{R} = \vec{W} \cdot (\vec{W} - \vec{U})^{-1} \cdot (\vec{r} - \vec{r}_0)$$

from the image points of the motif plane 32. Conversely, the lattice vectors of the motif plane 32 result from the lens grid and the desired moiré image lattice through $$\vec{U} = \vec{W} \cdot (\vec{T} + \vec{W})^{-1} \cdot \vec{T}$$

and $$\vec{r} = \vec{W} \cdot (\vec{T} + \vec{W})^{-1} \cdot \vec{R} + \vec{r}_0.$$

If the transformation matrix $\vec{A} = \vec{W} \cdot (\vec{W} - \vec{U})^{-1}$ is defined that transitions the coordinates of the points in the motif plane 32 and the points in the moiré image plane 36, $$\vec{R} = \vec{A} \cdot (\vec{r} - \vec{r}_0) \text{ and } \vec{r} = \vec{A}^{-1} \cdot \vec{R} + \vec{r}_0,$$

then, from two of the four matrices $\vec{U}$, $\vec{W}$, $\vec{T}$, $\vec{A}$ in each case, the other two can be calculated. In particular:

$$\vec{T} = \vec{A} \cdot \vec{U} = \vec{W} \cdot (\vec{W} - \vec{U})^{-1} \cdot \vec{U} = (\vec{A} - \vec{I}) \cdot \vec{W} \quad \text{(M1)}$$

$$\vec{U} = \vec{W} \cdot (\vec{T} + \vec{W})^{-1} \cdot \vec{T} = \vec{A}^{-1} \cdot \vec{T} = (\vec{I} - \vec{A}^{-1}) \cdot \vec{W} \quad \text{(M2)}$$

$$\vec{W} = \vec{U} \cdot (\vec{T} - \vec{U})^{-1} \cdot \vec{T} = (\vec{A} - \vec{I})^{-1} \cdot \vec{T} = (\vec{A} - \vec{I})^{-1} \cdot \vec{A} \cdot \vec{U} \quad \text{(M3)}$$

$$\vec{A} = \vec{W} \cdot (\vec{W} - \vec{U})^{-1} = (\vec{T} + \vec{W}) \cdot \vec{W}^{-1} = \vec{T} \cdot \vec{U}^{-1} \quad \text{(M4)}$$

applies, $\vec{I}$ designating the identity matrix.

As described in detail in the referenced German patent application 10 2005 062 132.5 and the international application PCT/EP2006/012374, the transformation matrix $\vec{A}$ describes both the moiré magnification and the resulting movement of the magnified moiré image upon movement of the moiré-forming arrangement 30, which derives from the displacement of the motif plane 32 against the lens plane 34.

The grid matrices T, U, W, the identity matrix I and the transformation matrix A are often also written below without a double arrow if it is clear from the context that matrices are being referred to.

EXAMPLE 1

The design of moiré-type magnification arrangements normally starts from a magnified moiré image as the target motif that is visible when viewed, the desired magnification factor and the desired movement behavior of the moiré images when the arrangement is tilted laterally and when tilted forward/backward. The desired magnification and movement behavior of the target motif can be combined in the transformation matrix $\vec{A}$.

Also the arrangement of the microlenses can, as in the present example, be specified via the lens grid matrix $\vec{W}$. Alternatively, also only certain limitations or conditions can be placed on the lens arrangement, and the required lens arrangement calculated together with the motif image.

For illustration, FIG. 4(*a*) shows a specified target motif 40, here in the form of the letter "P", and FIG. 4(*b*), a specified lens array having spherical microlenses 46 that are arranged in a simple square lattice, the lens grid 42 having square lattice cells 44.

The magnification and movement behavior is specified in the exemplary embodiment in the form of the transformation matrix $$A = \begin{pmatrix} 7 & 0 \\ 0 & 7 \end{pmatrix} \quad \text{(B1-1)}$$

which describes a pure magnification by a factor of 7. Let it be emphasized here that, to illustrate the inventive principle, deliberately simple exemplary embodiments are described that allow for good and approximately true-to-scale graphical depiction. For this, in this and in the following examples, simple and high-symmetry lattice arrangements and simple transformation matrices are chosen.

From the cited specifications, the micromotif to be introduced into the motif plane is obtained in the manner described above by applying the inverse matrix $\vec{A}^{-1}$ to the target motif. Also the motif grid $\vec{U}$ in which the micromotif elements must be arranged is defined by the given specifications and results according to relationship (M2) through $$\vec{U} = (\vec{I} - \vec{A}^{-1}) \cdot \vec{W}. \tag{B1-2}$$

FIG. 5(a) shows the thus-calculated micromotif element 50 to be introduced and the motif grid 52, which, for the chosen specifications, likewise depicts a simple square lattice. In addition, a portion of the lens grid 42 is drawn in with dotted lines. As can be seen in FIG. 5(a), the periodicity length $L_U$ of the motif grid 52 is somewhat smaller than the periodicity length $L_W$ of the lens grid 42, and is actually $$L_U = 6/7 * L_W,$$

as yielded by the relationships (B1-1) and (B1-2).

As can further be seen in FIG. 5(a), in the case of the chosen specifications, the micromotif element 50 to be introduced is larger than a lattice cell 54 of the motif grid 52. Thus, if the micromotif element 50 is arranged, in the conventional manner, periodically repeatedly in the motif grid 52, then the motif image 56 shown in FIG. 5(b) results, which exhibits strong overlaps of the individual motif elements 50. If the motif image 56 is viewed with the lens array in FIG. 4(b), then also the resulting magnified moiré image displays corresponding undesired overlaps of the magnified letters "P", and the target motif 40 cannot be seen as such in the moiré image.

To eliminate these overlaps and facilitate the depiction of a gapless, high-contrast moiré image having non-overlapping moiré image elements, according to the present invention, uniform motif subsets of the micromotif element arrangement 66 in FIG. 5(b) are identified in which the micromotif elements 50 are arranged repeatedly, free of overlaps. For these motif subsets, uniform lens subsets of the lens grid 42 corresponding to the motif subsets are then determined and allocated to the respective motif subset. For each lens subset, the intersection of the lens subgrid corresponding to this subset with the associated motif subset is then determined, and lastly, the resulting intersections composed according to the relative position of the lens subset in the lens grid 42 to form the motif image to be arranged in the motif plane.

Here, the fact that the identified motif subsets are all to be "uniform" meant that the motif subsets together with the corresponding lens subsets of the lens grid 42 each form moiré-type magnification arrangements that, according to the above-indicated relationships between the image points of the moiré image plane and the image points of the motif plane $$\vec{R} = \vec{W} \cdot (\vec{W} - \vec{U})^{-1} \cdot (\vec{r} - \vec{r}_0) \text{ and } \vec{R} = \vec{A} \cdot (\vec{r} - \vec{r}_0),$$

lead to the same target motif.

To determine such uniform motif subsets in the concrete exemplary embodiment, first, a superlattice grid of the motif grid 52 is identified in which the micromotif elements 50 can be arranged without overlaps. A superlattice grid is understood here to be a grid whose unit cell includes multiple lattice cells of the motif grid.

FIG. 6 shows such a motif superlattice grid 62 having lattice cells 64 that each consist of 2×2 lattice cells 54 of the motif grid 52 drawn in with dotted lines. The periodicity length $L_{U'}$ of the superlattice grid 62 is thus twice as large in both spatial directions as the periodicity length $L_U$ of the motif grid 52. In particular, the motif superlattice grid 62 is chosen just such that its lattice cells 64 are larger than the micromotif element 50 that is to be introduced repeatedly. The choice of such a superlattice grid is not unambiguous, in the exemplary embodiment, for example, also a superlattice grid having 2×3, 2×3, 3×3, or an even larger number of lattice cells 54 could have been chosen. To use the space available in the motif image to optimum advantage, preferably that motif superlattice grid is chosen that has the smallest unit cell that is still large enough to completely hold a micromotif element 50.

If the micromotif element 50 is now arranged repeatedly in the motif plane with the periodicity of the motif superlattice grids 62, so in the exemplary embodiment with the periodicity length $L_{U'}$, then, in accordance with the choice of the superlattice grid 62, no more overlaps of the micromotif elements 50 result, as shown in FIG. 6(a). Here, the arrangement 66 of the micromotif elements 50 in FIG. 6(a), repeated with the periodicity length $L_{U'}$, represents only a subset of the whole arrangement 56 of the micromotif elements 50 in FIG. 5(b), repeated with the periodicity length $L_U$, and in the exemplary embodiment, due to $$L_{U'} * L_{U'} = \frac{1}{4} L_U * L_U,$$

includes only one fourth of the original elements.

FIG. 6(b) shows a portion of the motif superlattice grid 62 and of the motif grid 52 drawn in with dotted lines again in detail. To the right of the two singled-out lattice cells 64 of the motif superlattice grid 62, the lattice vectors $\vec{u}_1$ and $\vec{u}_2$ of the motif grid 52 are drawn in.

As evident from FIG. 6(b), the motif grid 52 can be broken down into four subgrids 52-1, 52-2, 52-3 and 52-4 that each include only one fourth of the original lattice cells 54 of the motif grid 52, and that each exhibit the symmetry of the motif superlattice grid 62, in other words have a periodicity length $L_{U'}$. Taken together, the four subgrids 52-1, 52-2, 52-3 and 52-4 yield precisely the complete motif grid 52 again. In the exemplary embodiment, the four subgrids are given by the respective upper left lattice cell 54 of each superlattice cell 64 (subgrid 52-1), by the respective upper right lattice cell 54 of each superlattice cell 64 (subgrid 52-2), by the respective lower left lattice cell 54 of each superlattice cell 64 (subgrid 52-3) and by the respective lower right lattice cell 54 of each superlattice cell 64 (subgrid 52-4).

With reference to a superlattice cell 64, the four subgrids 52-1, 52-2, 52-3 and 52-4 exhibit an offset that is described in each case by a subgrid displacement vector $v_1$, $v_2$, $v_3$, or $v_4$ (FIG. 6(b)). The displacement vectors can be expressed by the lattice vectors $\vec{u}_1$ and $\vec{u}_2$ by means of $$v_1 = 0;$$

$$v_2 = u_1;$$

$$v_3 = u_2; \text{ and}$$

$$v_4 = u_1 + u_2.$$

Likewise drawn in in FIG. 6(b) are the four uniform motif subsets 66-1, 66-2, 66-3 and 66-4 that result due to the displacement of the non-overlapping arrangement 66 of the motif elements 50 by the displacement vectors $v_1$ to $v_4$. Through the design of the motif subsets is ensured that each of the motif subsets includes an overlap-free arrangement of the motif elements 50, that the motif subsets are uniform and thus produce in each case, when viewed with the lens array, the same target motif, and that the motif subsets taken together yield precisely the complete motif element arrangement 56 in FIG. 5(b) again.

Through the above-indicated relationship (M3), a superlattice grid 72 of the lens grid 42 corresponds to the superlattice grid 62 of the motif grid 52. In the exemplary embodiment, in which each superlattice cell 64 of the motif superlattice grid 62 consists of 2×2 lattice cells 54 of the motif grid 52, the lens superlattice grid 72 is formed from superlattice cells 74 that likewise consist of 2×2 lattice cells 44 of the lens grid 42. The periodicity length $L_{W'}$ of the lens superlattice grid 72 is thus twice as large in both directions as the periodicity length $L_W$ of the lens grid 42.

This lens superlattice grid 72, which forms the starting point for the further approach, is depicted in FIG. 7 together with the micromotif elements 50 repeated with the periodicity $L_{U'}$ of the motif superlattice grid 62.

Figure 7B:
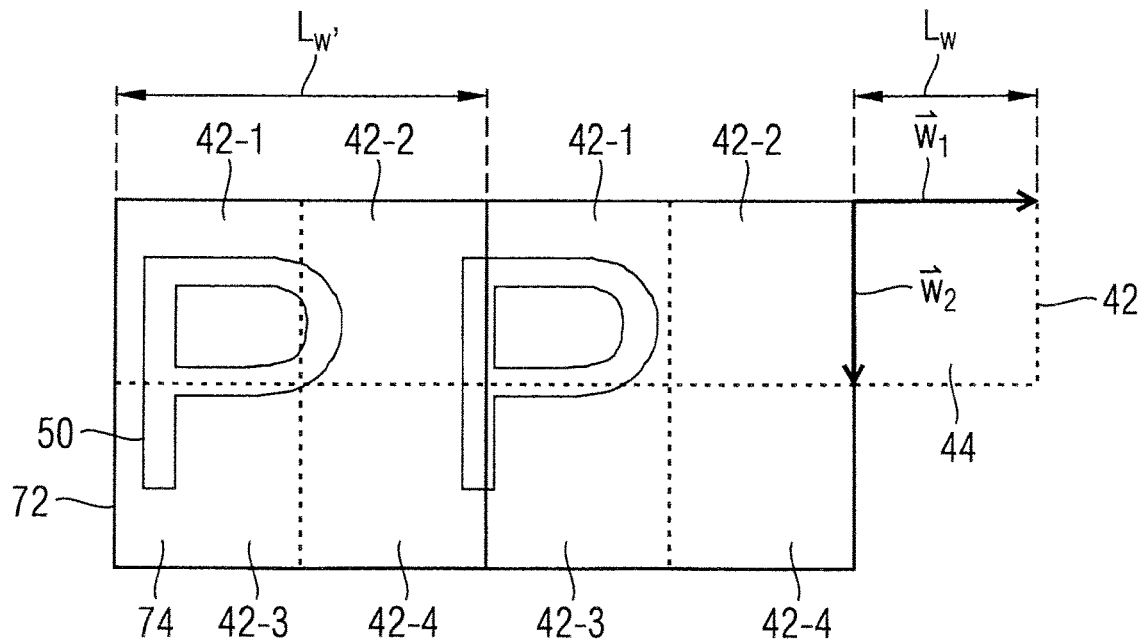

Analogously to the breakdown of the motif grid 52 in FIG. 6(b), also the lens grid 42 can be broken down into four subgrids 42-1, 42-2, 42-3 and 42-4 that each include only one fourth of the original lattice cells 44 of the lens grid 42 and exhibit the symmetry of the lens superlattice grid 72, in other words a periodicity length $L_{W'}$. This is illustrated in FIG. 7(b), which shows in detail the lens superlattice grid 72 and the lens grid 42 drawn in with dotted lines. To the right of the two singled-out lattice cells 74 of the lens superlattice grid 72, the lattice vectors $\vec{w}_1$ and $\vec{w}_2$ of the lens grid 42 are drawn in. As evident from FIG. 7(b), the four subgrids 42-1, 42-2, 42-3 and 42-4 of the lens grid 42 each include one fourth of the original lattice cells and, together, yield the complete lens grid 42. In the exemplary embodiment, the four subgrids are given by the respective upper left lattice cell 44 of each superlattice cell 74 (subgrid 42-1, see also FIG. 8(a)), by the respective upper right lattice cell 44 of each superlattice cell 74 (subgrid 42-2, see also FIG. 8(b)), by the respective lower left lattice cell 44 of each superlattice cell 74 (subgrid 42-3, see also FIG. 8(c)) and by the respective lower right lattice cell 44 of each superlattice cell 74 (subgrid 42-4, see also FIG. 8(d)).

As now explained with reference to FIG. 8, to obtain a complete and overlap-free motif image, for each of the subgrids 42-1, 42-2, 42-3 and 42-4 of the lens grid 42, a sectional image having a suitably displaced arrangement 66 of the motif image elements 50, in other words having one of the motif subsets 66-1, 66-2, 66-3 and 66-4, is determined and the sectional images of the four subgrids composed in accordance with their relative position in the lens superlattice grid 72.

First, the first subgrid 42-1 is selected, as shown in FIG. 8(a), and intersected with the arrangement of the motif image elements 50 identified for FIG. 6(a). Here, the motif image element arrangement (motif subset) 66-1 before the intersection is depicted gray, the cut-out motif image portions 80-1, black. Here, the undisplaced motif image element arrangement 66-1 corresponds to a displacement of the motif image element arrangement 66 in FIG. 6(a) by the subgrid displacement vector $v_1=0$ of the first motif subgrid 52-1.

Then, as shown in FIG. 8(b), the second subgrid 42-2 of the lens grid 42 is selected. The motif subgrid 52-2 corresponding to the second lens subgrid 42-2 exhibits, in relation to the superlattice cell 64, a subgrid displacement vector $v_2=u_1$ (FIG. 6(b)). The motif image element arrangement 66 in FIG. 6(a) is now first displaced in the motif plane by this displacement vector $v_2$ and then intersected with the second lens subgrid 42-2. Also in FIG. 8(b), the displaced motif image element arrangement (motif subset) 66-2 is depicted gray before the intersection and the cut-out motif image portions 80-2 are black.

This approach is then repeated with the third subgrid 42-3 and the fourth subgrid 42-4, the motif image element arrangement 66 in FIG. 6(a) being displaced before the intersection in each case by the displacement vector $v_3$ or $v_4$. The subgrids 42-3 and 42-4, the displaced motif image element arrangements (motif subsets) 66-3 or 66-4 and the cut-out motif image portions 80-3 and 80-4 are depicted in FIGS. 8(c) and 8(d). Through the described repeated displacement of the motif image element arrangement 66 for the different subgrids, disjoint subsets of the complete arrangement 56 of the micromotif elements 50 shown in FIG. 5(b) are perceived in each case and, altogether, all micromotif elements 50 taken into account.

It is understood that, for another choice of superlattice, also another number and arrangement of the subgrids can result. For example, in a lens and motif superlattice composed of 2×3 lattice cells, there are 6 subgrids whose offset can be expressed in each case by subgrid displacement vectors $v_1$ to $v_6$. Accordingly, 6 intersections of the subgrids are then produced with the appropriately displaced motif image element arrangements.

Lastly, the four sectional images 80-1, 80-2, 80-3 and 80-4 are composed in accordance with the relative position of the subgrids 42-1, 42-2, 42-3 and 42-4 such that the finished motif image 82 illustrated in FIG. 8(e) results. For greater clarifity, the lens superlattice grid 72 is shown dotted.

If this motif image 82 is now viewed with the lens array in FIG. 4(b), then the magnified moiré image 84, shown in FIG. 8(f), that shows the desired, non-overlapping moiré image elements 86 magnified 7× in accordance with the specified transformation matrix results.

EXAMPLE 2

Example 2 starts, like example 1, from the target motif 40 in the form of the letter "P" specified in FIG. 4(a), and the lens array having a square lens grid 42 specified in FIG. 4(b). It is understood that, in place of the letter "P" shown here in the example, also alphanumeric character strings, entire texts or other larger motifs can be handled in the same way. Thus, according to this method, also a longer word that does not fit under a lens in the lens array of a moiré magnifier can be magnified according to the moiré magnifier magnification principle according to the present invention.

In example 2, the magnification and movement behavior is specified by the transformation matrix $$A = \frac{1}{2\sin 4°}\begin{pmatrix} \cos 86° & -\sin 86° \\ \sin 86° & \cos 86° \end{pmatrix}$$

with which, in addition to a magnification, also an approximately orthoparallactic movement effect is described.

As in example 1, from the transformation matrix A and the lens grid matrix W is first obtained, with the aid of the inverse matrix $A^{-1}$, the micromotif element to be introduced into the motif plane, and the motif grid U.

Also in example 2, the chosen specifications lead to a micromotif element 90 (FIG. 9) that is larger than the dimension $L_U$ of a lattice cell of the motif grid U. A conventional repeated arrangement of the micromotif elements 90 at the spacing $L_U$ thus leads to overlaps of the micromotif elements in the motif image and thus also to undesired overlaps in the magnified moiré image.

To eliminate these overlaps and to depict a gapless, high-contrast moiré image having non-overlapping moiré image elements, a superlattice grid of the motif grid U is identified in which the micromotif elements 90 can be arranged free of overlaps. FIG. 9 shows such a non-overlapping arrangement 92 of the micromotif elements 90 within a motif superlattice that consists of 2×2 motif lattice cells.

Then the motif grid is broken down into four subgrids and the subgrid displacement vectors $v_j$ (j=1 ... 4) for the offset of the appropriate subgrid determined.

Further, the lens superlattice grid corresponding to the motif superlattice grid is determined and likewise broken down into four subgrids. One of these four subgrids 94-*j* is depicted in FIG. 10, together with the periodicity length $L_{W''}$ of the lens superlattice grid and the periodicity length $L_W$ of the lens grid.

Now, analogously to the approach described for FIG. 8, for each of the lens subgrids 94-*j*, the associated motif subgrid and its subgrid displacement vector $v_j$ is identified, the overlap-free arrangement 92 of the motif image elements 90 displaced by this subgrid displacement vector $v_j$ and brought to intersect with the lens subgrid 94-*j*. The resulting four sectional images are then composed in the lens superlattice grid in accordance with the position of the lens subgrid 94-*j*, as shown in FIG. 11, and form the finished motif image 95.

If this motif image 95 is now viewed with the lens array in FIG. 4(*b*), then the magnified moiré image 96, shown in FIG. 12, that shows the desired, non-overlapping moiré image elements 98 magnified in accordance with the specified transformation matrix results.

With the magnification and movement matrix A applied in example 2, an approximately orthoparallactic movement effect is achieved: when the moiré arrangement consisting of the motif image 95 in FIG. 11 and the lens grid in FIG. 4(*b*) is tilted laterally, the magnified moiré image 96 in FIG. 12 moves approximately in a vertical direction, and upon tilting vertically, it moves laterally to the right or left.

EXAMPLE 3

Example 3 illustrates an alternative and particularly simple method to accommodate large image motifs in a moiré magnifier arrangement. For example, an entire alphabet can be accommodated in a moiré magnifier, the approach being explained for the first letters of the alphabet based on FIG. 13.

FIG. 13(*a*) shows a motif layer 100 composed of motifs "A", "B", "C" that, combined with the appropriate lens grid, yields the magnified moiré image 108 in FIG. 13(*b*), For this, for each letter to be depicted, the micromotif elements 102-A, 102-B, 102-C are accommodated in an areal section 104-A, 104-B, 104-C of the motif layer 100 of the moiré magnifier that is precisely so large that it can hold the moiré-magnified letters 106-A, 106-B, 106-C of the moiré image 108. Here, the repeat of the motif that customarily occurs in the moiré magnifier is thus suppressed according to the present invention.

EXAMPLE 4

With reference to the example 4 illustrated in FIG. 14, the letters "A" (206-A), "B" (206-B), "C" (206-C) and any further components of the moiré image 208 shown in FIG. 14(*b*) can, upon tilting, also move in different ways. For example, when tilted laterally, the letters 206-A, 206-B, 206-C ... are to move alternately upward and downward, but when tilted vertically, in the same direction.

Let a denote the lens spacing in the hexagonal lens grid in FIG. 14(*b*). The lens grid arrangement of FIG. 14(*b*) is then described by the matrix $$W = \begin{pmatrix} 0 & a/2 \\ a & a\sqrt{3}/2 \end{pmatrix}.$$

If m is the desired moiré magnification factor, then a vertical movement in the moiré image upon tilting laterally is described by the movement matrix $$A_1 = m \cdot \begin{pmatrix} 0 & 1 \\ 1 & 0 \end{pmatrix}.$$

An opposite vertical movement in the image upon tilting laterally while maintaining the movement direction upon tilting vertically is described by the movement matrix $$A_2 = m \cdot \begin{pmatrix} 0 & 1 \\ -1 & 0 \end{pmatrix}$$

For the motif arrangements for the motif letters "A" (202-A) and "C" (202-C) in the fields 204-A and 204-C of the motif layer 200 (FIG. 14(*a*)), we choose the grid matrix $$U_1 = (I - A_1^{-1}) \cdot W =$$
$$\begin{pmatrix} 1 & -1/m \\ -1/m & 1 \end{pmatrix} \cdot \begin{pmatrix} 0 & a/2 \\ a & a\sqrt{3}/2 \end{pmatrix} = \begin{pmatrix} -a/m & a/2 - a\sqrt{3}/2m \\ a & -a/2m + a\sqrt{3}/2 \end{pmatrix}.$$

For the motif arrangement for the motif letters "B" (202-B) in the field 204-B in FIG. 14(*a*), we choose $$U_2 = (I - A_2^{-1}) \cdot W =$$
$$\begin{pmatrix} 1 & 1/m \\ -1/m & 1 \end{pmatrix} \cdot \begin{pmatrix} 0 & a/2 \\ a & a\sqrt{3}/2 \end{pmatrix} = \begin{pmatrix} a/m & a/2 + a\sqrt{3}/2m \\ a & -a/2m + a\sqrt{3}/2 \end{pmatrix}.$$

For grid arrangements chosen in this way, when tilted laterally in the tilt direction 210 (to the top right, to the bottom left), the letters "A" (206-A) and "C" (206-C) in FIG. 14(*b*) move upward (direction 212), the letter "B" (206-B) in FIG. 14(*b*) downward (direction 214). When tilted vertically (front upward), all letters move to the right, when tilted back, to the left.

If the letters are to move oppositely also when tilted vertically, the following movement matrix is applied. A particular effect in such opposite movements is that the letters assemble into an easily perceptible sequence (e.g. a word, in the exemplary embodiment "ABC") only in certain tilt directions.

$$A_2 = -m \cdot \begin{pmatrix} 0 & 1 \\ 1 & 0 \end{pmatrix}$$

$$U_2 = (I - A_2^{-1}) \cdot W =$$

$$\begin{pmatrix} 1 & 1/m \\ 1/m & 1 \end{pmatrix} \cdot \begin{pmatrix} 0 & a/2 \\ a & a\sqrt{3}/2 \end{pmatrix} = \begin{pmatrix} a/m & a/2 + a\sqrt{3}/2m \\ a & a/2m + a\sqrt{3}/2 \end{pmatrix}$$

These movement sequences are cited merely by way of example. Other movement sequences in arbitrary directions upon tilting can be calculated in accordance with the teaching of PCT/EP2006/012374, the disclosure of which is incorporated herein by reference. Also, the movement direction and/or magnification can change locally, the regional widths and regional limits being adjusted accordingly.

EXAMPLE 5

As set forth in the application PCT/EP2006/012374, already mentioned multiple times, and also incorporated in the present description in this respect, it is possible to use, in the moiré magnifier, motif lattice cells that are extended infinitely in one direction (e.g. vertically) and that have arbitrarily long motifs. In other directions (e.g. laterally), the lattice cell size is limited. Here—as explained in PCT/EP2006/012374—either cylindrical lenses or two-dimensional lens arrays can be used.

Figure 15A:
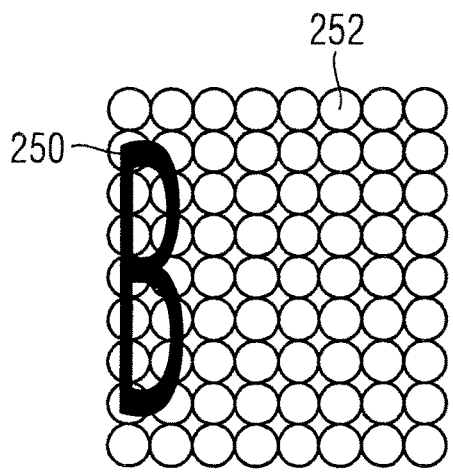
Figure 15B:
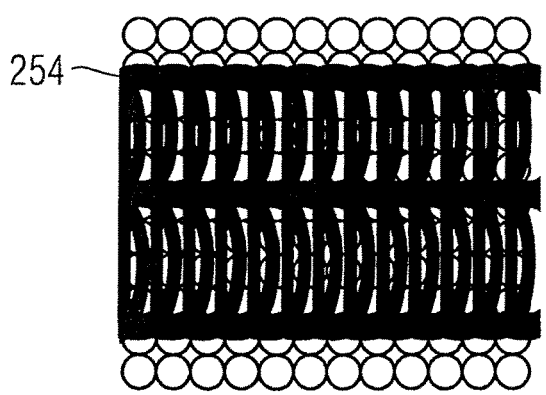
Figure 15C:
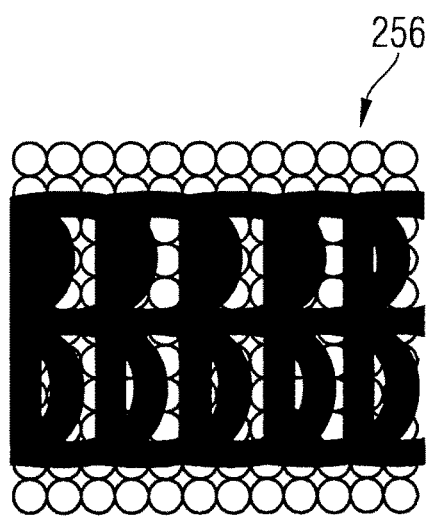
Figure 15D:
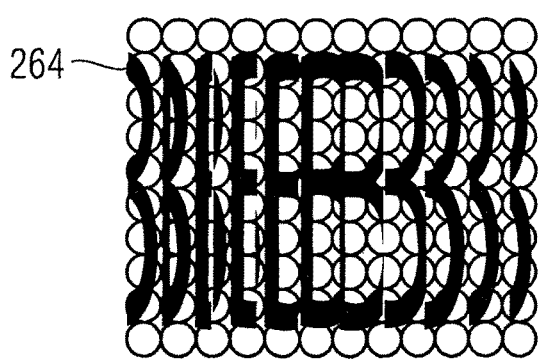
Figure 15E:
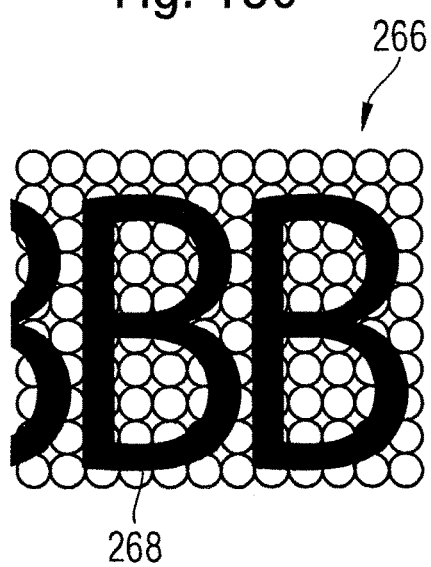

If, in one direction, a larger motif having 1:1 imaging is present, it is possible to apply the approach of example 1, modified accordingly. FIG. 15 shows a concrete example for this. A distorted motif 250 (letter "B") is to be imaged 1:1 heightwise, magnified widthwise, and distorted. Widthwise, the motif extends across the width of two lenses 252 in the lens grid, see FIG. 15(a). In this way, without the approach according to the present invention, an overlapping motif element arrangement 254 results, as depicted in FIG. 15(b), and accordingly, also an overlapping moiré image 256, as shown in FIG. 15(c). Instead, in an inventive approach analogous to example 1, the motif image 264 depicted in FIG. 15(d) and an ordinary moiré image 266 having non-overlapping moiré image elements 268 are obtained, as shown in FIG. 15(e).

For examples 1 to 5, for illustration, deliberately simple examples were chosen that allow for good and approximately true-to-scale drawing. Simple, very symmetrical lattice arrangements W (hexagonal or square) were chosen, and simple magnification and movement matrices A (only magnification or magnification with rotation). The present invention comprises, of course, for the matrix W, all two dimensional Bravais lattices, especially also those of low symmetry, and for A, all two-dimensional matrices, i.e. all products of magnification, mirroring, rotating and shear mapping, as explained in detail in, for example, the publication PCT/EP2006/012374, which, in this respect, is incorporated in full in the present application.

We claim:

1. A security element for security papers, value documents and the like, having a microoptical moiré-type magnification arrangement for the non-overlapping depiction of a specified moiré image having multiple moiré image elements, having
   a motif image that includes a periodic or at least locally periodic arrangement of a plurality of lattice cells having micromotif elements, each micromotif element corresponding to one of the moiré image elements, for the moiré-magnified viewing of the motif image, a focusing element grid that is arranged spaced apart from the motif image and that includes a periodic or at least locally periodic arrangement of a plurality of lattice cells having one microfocusing element each,
   wherein the motif image is broken down into areal regions that are each allocated to one of the moiré image elements and correspond in position and size to the allocated moiré image element, each areal region being allocated to a moiré image element independent from the adjacent areal region; wherein the micromotif elements corresponding to a moiré image element are each arranged repeatedly in the areal region of the motif image that is allocated to this moiré image element, and wherein each areal region is precisely so large that the motif image therein is not repeated.

2. The security element according to claim 1, characterized in that the security element exhibits an opaque cover layer to cover the moiré-type magnification arrangement in some regions.

3. The security element according to claim 1, characterized in that the motif image and the focusing element grid are arranged at opposing surfaces of an optical spacing layer.

4. The security element according to claim 1, characterized in that the focusing element grid is provided with a protective layer whose refractive index differs from the refractive index of the microfocusing elements preferably by at least 0.3.

5. The security element according to claim 1, characterized in that the security element is a security thread, a tear strip, a security band, a security strip, a patch or a label for application to a security paper, value document or the like.

6. A method for manufacturing a security element having a microoptical moiré-type magnification arrangement for the non-overlapping depiction of a specified moiré image having multiple moiré image elements, in which
   a motif image having a periodic or at least locally periodic arrangement of a plurality of lattice cells having micromotif elements is produced, each micromotif element corresponding to one of the moiré image elements,
   a focusing element grid for the moiré-magnified viewing of the motif image, having a periodic or at least locally periodic arrangement of a plurality of lattice cells having one microfocusing element each, is produced and arranged spaced apart from the motif image,
wherein the motif image is broken down into areal regions that are each allocated to one of the moiré image elements and correspond in position and size to the allocated moiré image element, each areal region being allocated to a moiré image element independent from the adjacent areal region; wherein the micromotif elements corresponding to a moiré image element are each arranged repeatedly in the areal region of the motif image that is allocated to this moiré image element, and wherein each areal region is precisely so large that the motif image therein is not repeated.

7. The method according to claim 6, characterized in that the motif grid lattice cells and the focusing element grid lattice cells are described by vectors $\vec{u}_1$ and $\vec{u}_2$ or $\vec{w}_1$ and $\vec{w}_2$, and these are modulated location dependently, the local period parameters $|\vec{u}_1|$, $|\vec{u}_2|$, $\angle(\vec{u}_1, \vec{u}_2)$ and $|\vec{w}_1|$, $|\vec{w}_2|$, $\angle(\vec{w}_1, \vec{w}_2)$ changing only slowly in relation to the periodicity length.

8. The method according to claim 6, characterized in that the motif image and the focusing element grid are arranged at opposing surfaces of an optical spacing layer.

9. The method according to claim 6, characterized in that the focusing element grid is provided with a protective layer whose refractive index differs from the refractive index of the microfocusing elements preferably by at least 0.3.

10. The method according to claim 6, characterized in that the motif image is printed on a substrate, the micromotif elements formed from the micromotif image portions constituting microcharacters or micropatterns.

11. The method according to claim 6, characterized in that the security element is further provided with an opaque cover layer to cover the moiré-type magnification arrangement in some regions.

* * * * *